(12) United States Patent
Reynolds et al.

(10) Patent No.: US 7,295,608 B2
(45) Date of Patent: Nov. 13, 2007

(54) SYSTEM AND METHOD FOR COMMUNICATING MEDIA SIGNALS

(76) Inventors: Jodie Lynn Reynolds, 13389 Folsom Blvd. #303-303, Folsom, CA (US) 95630; Robert Walter Ingraham, 127 Honey Cook Cir., Folsom, CA (US) 95630

( * ) Notice: Subject to any disclaimer, the term of this patent is extended or adjusted under 35 U.S.C. 154(b) by 920 days.

(21) Appl. No.: 10/256,866

(22) Filed: Sep. 26, 2002

(65) Prior Publication Data

US 2004/0045030 A1 Mar. 4, 2004

Related U.S. Application Data

(60) Provisional application No. 60/325,483, filed on Sep. 26, 2001.

(51) Int. Cl.
*H04N 7/12* (2006.01)
(52) U.S. Cl. ............. 375/240.01; 375/240; 375/240.12
(58) Field of Classification Search ................ 375/240, 375/240.01, 240.12, 240.1, 240.08; 348/14.12, 348/412.1; 725/105
See application file for complete search history.

(56) References Cited

U.S. PATENT DOCUMENTS

| | | | |
|---|---|---|---|
| 5,481,297 A * | 1/1996 | Cash et al. ............... | 348/14.12 |
| 5,517,246 A * | 5/1996 | Suzuki ..................... | 348/412.1 |
| 5,539,908 A | 7/1996 | Chen et al. ................ | 395/700 |
| 5,596,659 A | 1/1997 | Normile et al. | |
| 5,649,030 A | 7/1997 | Normile et al. | |
| 5,684,714 A | 11/1997 | Yogeshwar et al. | |
| 5,822,465 A | 10/1998 | Normile et al. | |
| 6,002,720 A | 12/1999 | Yurt et al. | |
| 6,031,939 A | 2/2000 | Gilbert et al. | |
| 6,085,236 A | 7/2000 | Lea ............................. | 709/220 |
| 6,115,755 A | 9/2000 | Krishan ...................... | 709/250 |
| 6,157,965 A | 12/2000 | Mohammed et al. .......... | 710/8 |
| 6,195,692 B1 | 2/2001 | Hsu ........................... | 709/219 |
| 6,212,302 B1 | 4/2001 | Honsinger et al. | |
| 6,243,676 B1 | 6/2001 | Witteman ................... | 704/243 |
| 6,252,544 B1 | 6/2001 | Hoffberg ................. | 342/357.1 |
| 6,349,151 B1 | 2/2002 | Jones et al. | |

(Continued)

FOREIGN PATENT DOCUMENTS

EP 0889471 B1 6/2004

(Continued)

OTHER PUBLICATIONS

Ostman, Charles; Sentience on Demand, as an Online Commodity; 1997, 1998; www.biota.org/ostman/sent1.htm;pp. 1-11.

*Primary Examiner*—Allen Wong
(74) *Attorney, Agent, or Firm*—Kory D. Christensen; Stoel Rives LLP

(57) ABSTRACT

A media streaming system for streaming media signals is provided. The media streaming system takes a library of separate and distinct CODECs that are provided as a searchable CODEC library and used in determining specific characteristics in the media signal to identify similar sections of the signal. The media streaming system uses a computer implemented intelligence system, such as an artificial intelligence mechanism to learn and capture the unique characteristics of a sinal as the signal is being streamed. The media streaming system also compresses and decompresses the media signal as the signals are streamed from a source media to a destination device.

35 Claims, 15 Drawing Sheets

U.S. PATENT DOCUMENTS

| | | |
|---|---|---|
| 6,356,545 B1 | 3/2002 | Vargo et al. |
| 6,356,589 B1 * | 3/2002 | Gebler et al. ............ 375/240.1 |
| 6,356,668 B1 | 3/2002 | Honsinger et al. |
| 6,421,726 B1 | 7/2002 | Kenner et al. .............. 709/225 |
| 6,587,638 B1 | 7/2003 | Watanabe et al. |
| 6,624,761 B2 | 9/2003 | Fallon ........................ 341/51 |
| 6,968,006 B1 * | 11/2005 | Puri et al. ............. 375/240.08 |
| 7,130,472 B2 | 10/2006 | Iizuka et al. |
| 2002/0062482 A1 * | 5/2002 | Bolle et al. ................. 725/105 |
| 2002/0097917 A1 | 7/2002 | Nelson et al. |
| 2003/0133501 A1 | 7/2003 | Ueda et al. |

FOREIGN PATENT DOCUMENTS

| | | |
|---|---|---|
| WO | 9918728 A1 | 4/1999 |
| WO | 02087255 A2 | 10/2002 |

* cited by examiner

Depiction of backhaul communications resulting from handoff of cellular communication when recipient transits into a second cellular area Browsing via the Set-Top Box Interactive Gaming

SYSTEM AND METHOD FOR COMMUNICATING MEDIA SIGNALS

RELATED APPLICATION

This application is a non-provisional application of "Reynolds et al. a provisional application entitled "System and Method for Communicating Media Signals", application number 60/325,483, filed on Sep. 26, 2001.

FIELD OF THE INVENTION

This invention is a system and method for communicating media signals between source and destination devices. More specifically, it is a system and method for compressing and decompressing streaming and static media signals for efficiently communicating those signals between source and destination devices using artificial intelligence mechanisms.

BACKGROUND OF THE INVENTION

The ability to efficiently communicate streaming and static media between remotely located devices is a significant need that has emerged exponentially with the advent of networked communications such as the Internet. This need has been recently addressed with substantial development resources on a worldwide scale.

The term "media" is herein intended to mean information that may be communicated in the form of a signal from a source device to a destination device for use by the destination device; and, where used herein, media is generally contemplated to comprise either streaming or static media signals. For the purpose of this disclosure, the term "use" as applied to a destination device's operation on media signals is intended to include playing (e.g. sounds, images, video), processing (e.g. telemetry data), or any other use or operation that is the intended purpose of the media signal.

The terms "streaming media" are herein intended to mean media signals that comprise information intended to be communicated to and used by a destination device in a temporal, streaming fashion. The term "streaming" as applied to streaming media signals is herein intended to include signals communicated and processed in a continuous manner over time, or signals that may be communicated in a series of discrete packets, pieces, or blocks that are interrelated and may be thereafter used by the destination device in a continuous, interrelated fashion. Examples of streaming media signals for the purpose of this disclosure therefore include, without limitation, the following types of media: video, audio, audio combined with video, and data strings such as temporal telemetry. The terms "streaming media" are most typically used by reference to digitized forms of data representing the subject media.

The terms "static media" are herein intended to generally mean media that is not "streaming" as defined above. Static media signals are of the type that generally may be communicated and are intended to be used as a single packet, block, or piece. Static media therefore may include for example, without limitation the following: a discrete image, an individual and relatively temporally short video clip, a sound or sound bite, or a piece or block of information such as telemetry information. It is contemplated, however, that such a "single piece" of static media may be of sufficient magnitude to consist of a plurality of smaller pieces or sub-parts, such as for example regions or pixels of an overall image, individual frames that together form a video clip, digital bits that together comprise a sound, a group of sounds that comprise a sound bite, or bits of information that together comprise a larger block of information.

Streaming media generally includes data files that are significantly larger than static media files, and also often represent many more variables over the temporal communication of such files than experienced with most static media files. Therefore, the ability to efficiently compress streaming media for appropriate communication to destination devices for use is often a much more complex and difficult to achieve goal. Accordingly, much of this disclosure is provided by reference specifically to streaming media communication, and the present invention has been observed to provide significant benefits for such communication. However, where streaming media is specifically referenced herein with respect to this background, and further with respect to the many benefits of the present invention herein disclosed, static media is also further contemplated where appropriate according to one of ordinary skill.

Many different "type-specific" media systems have been in use for quite a long time for transmitting specific types (e.g. video, audio, image, voice, etc.) of streaming and static media signals between sources and remote destinations. Typical examples of such type-specific media systems include television transmission systems, telephone line systems, and radio transmission systems, and every television, telephone, and radio is therefore a receiving device for media. Accordingly, the needs for efficient communication of streaming and static media touch upon many diverse communications industries, including for example the telephone, television, movie, music, and more recently interactive gaming industries.

Moreover, many medial communications systems, including the various long-standing type-specific systems, are also "format specific", wherein the subject media signals are communicated in a particular format such that the source, transmission channel, and destination device must be specifically compliant to work within that format. Examples of format specific media systems include for example encoded cable television systems that work only for certain types of media and only delivered in particular encoded formats from the cable carrier. Therefore, these systems, in hardware and software, are generally dedicated to only the type and format of media to be provided by the content provider.

Society's needs have outpaced the abilities of these dedicated, content-specific and format-specific systems. In particular, these dedicated systems are not structured to accommodate the ever increasing client demand, real-time, for specified streaming media. Still further, technology developments in the recently interconnected world has tempted the palate of society for the ability to pull, receive, push, and send multiple types of media in multiple formats using one device. Moreover, content providers need to be able to deliver many different media signals to many different types of devices in their clients' offices, living rooms, and hands. Individuals and corporations also desire to communicate with each other using various different formats and using various different respective devices.

Accordingly, a significant industry has emerged for delivering streaming and static media over the centralized network of the Internet. Content delivery companies are currently delivering a wide range of streaming media, from live horse racing and entertainment to medical telemetry and education, over the Internet, and in video and audio formats. According to one published report from DFC Intelligence, video streaming on the Internet grew 215 percent in 2000 to over 900 million total streams accessed. This includes broadband streams, which made up almost 29 percent of total accesses. This same report also estimates that as much as 15 percent of available stream inventory is now being exploited with in-stream advertising. In another report published by Internet researcher Jupiter Media Metrix, business spending alone on streaming video technology will balloon from one-hundred forty million (US$140M) US dollars in 2000 to nearly three billion (US$3B) US dollars by 2005 as companies turn to electronic interaction in communicating with employees, consumers and other businesses.

Still further, the population explosion and increasing number of people transmitting on these systems has severely impacted the available bandwidth for available information. Therefore, the ability to stream media efficiently, using limited bandwidth resources and limited available transmission speeds, is of increased societal importance.

Compression/Decompression Algorithms ("CODECS")

In view of the exponential demand for communicating the different types of media, various compression/decompression systems ("CODEC(s)") have been developed over many years, and have in particular become the recent topic of significant research and development. Specific types of CODECS and systems for managing the operation of CODECS with respect to communicating streaming and static media signals have been developed for specific types of media, including for example still-frame images such as graphics and photographs, and streaming media.

Image CODECS

Various different types of static media CODECS have been developed, and a wide variety of these CODECS are widely known and used. One specific type of static media that has been the topic of particular attention includes images (though a long series of interrelated image frames such as in video context is generally treated as streaming media due to more complex variables, e.g. size and temporal relationship between frames, that significantly impact appropriate compression/decompression needs). Examples of static media CODECing is therefore herein exemplified by reference to certain specific types of conventional image CODEC technologies and methods.

The two most common file formats for graphic images on the world wide web are known as "GIF" and "JPEG" formats, generally considered the respective standards for drawings (e.g. line art) and photographs, and are further described together with other image compression modalities for the purpose of further understanding as follows.

"JPEG" is an acronym for "Joint Photographic Experts Group", and is a graphic image file that complies with ISO standard 10918. Commonly used for photograph compression/decompression, a JPEG file is created by choosing from a range of compression qualities, or, as has also been described, by choosing from one of a suite of compression algorithms. In order to create a JPEG file, or convert an image from another format to JPEG, the quality of image that is desired must be specified. In general, because the highest quality results in the largest file, a trade-off may then be made, as chosen by the user, between image quality and image size. The JPEG mode of compression generally includes 29 distinct coding processes although a JPEG implementer may not use them all. A JPEG image is typically given a name suffix ".jpg".

"GIF" is an acronym for "Graphics Interchange Format", and is generally considered the de facto standard form of drawing image compression/decompression for Internet communication. GIF formatting uses a compression algorithm known as the LZW algorithm, which was developed by Abraham Lempel, Jacob Ziv, and Terry Welch and made commercially available by Unisys Corporation (though in general such algorithm has been made publicly available without requiring fee-bearing licenses). More specifically, a "LZW" compression algorithm takes each input sequence of bits of a given length (e.g. 12 bits) and creates an entry in a table, sometimes called a "dictionary" or "codebook", for that particular bit pattern. The entry consists of the pattern itself and a shorter code. As input is read, any pattern that has been read before results in the substitution of the shorter code, effectively compressing the total amount of input to something smaller. Earlier approaches, known as LZ77 and LZ78, did not include the look-up table as part of the compressed file. However, the more recent LZW algorithm modality does include the table in the file, and the decoding program that decompresses the file for viewing is able to build the table itself using the algorithm as it processes the encoded input. The GIF format uses the 2D raster data type (associated with display screens using raster lines) and is encoded in binary.

Two versions of GIF formats include GIF 87a, and more recently GIF89a that allows for "animated GIF" file creation, or short sequences of images within a single GIF file that are played in sequence to present movement or change in the image (either in an endless loop or through a progression that reaches an end). GIF89A also allows for, and also for "interlaced GIF", which is a GIF image that arrives and is displayed by the receiver first as a fuzzy outline of an image that is gradually replaced by seven successive waves of bit streams that fill in the missing lines until full resolution is reached. Interlaced GIF allows, for example, a viewer using 14.4 Kbps and 28.8 Kbps modems to observe a briefer wait-time before certain information in a subject image may be processed, such as for example to make decisions (e.g. to click on the image to execute an operation such as a link).

By presenting waves of resolution filling image sequences, interlaced GIF is similar to "Progressive JPEG", which describes an image created using the JPEG suite of compression algorithms that will "fade in" in successive waves. While the progressive JPEG is often observed to be more appealing way to deliver an image at modem connection speeds, users with faster connections may not likely notice a difference.

"PNG" or "Portable Network Graphics" format has been more recently developed for image compression and that, in time, has been publicized to replace the GIF format for Internet use (though not generally the JPEG format allowing size/quality trade-offs). This format has been developed for public consumption and development. Similar to GIF, PNG is considered a "lossless" compression format, and therefore all image information is restored when a compressed file is decompressed during viewing. However, PNG formatted files are generally intended to be from 10 to 30 percent more compressed than with a GIF format. Further aspects of PNG file formats are provided as follows: (i) color transparency may not be limited to only one color, but the degree of transparency may be controlled ("opacity"); (ii) "interlacing" of images is improved versus standard GIF; (iii) "gamma correction" is enabled, allowing for "tuning" of images in terms of color brightness required by specific display manufacturers; (iv) images can be saved using true color, palette, and gray-scale formats similar to GIF; and (v) "animation" is generally not supported, though PNG is generally considered extensible and therefore software may be layered to provide for such scriptable image animation.

"TIFF" is an acronym for "Tag Image File Format", and is a common format for exchanging raster graphics (or "bitmap") images between application programs, such as for example graphics used for scanner images. A TIFF file is usually given a name suffix of ".tif" or ".tiff", and had generally been developed in the mid-1980's with the support of Adobe Software, Microsoft, and Hewlett-Packard. TIFF files can be in any of several classes, including gray scale, color palette, or RGB full color, the descriptions and differences of which are further developed elsewhere herein this disclosure. TIFF files may also include files with JPEG, LZW, or CCITT Group 4 standard run-length image compression, which are also further described elsewhere herein. As one of the most common graphic image formats, TIFF files are typically used in desktop publishing, faxing, 3-D applications, and medical imaging applications.

Video CODECS

Video compression has been the topic of intense development for various applications, including, for example: pre-recorded video (e.g. "video-on-demand"), teleconferencing, and live video (e.g. broadcasts). "Desk-top" computers, wireless devices, conventional televisions, and high definition televisions are examples of the different types of receiving devices that an efficient video compression system must serve.

In general, video CODEC algorithms operate on either or both of an individual, frame-by-frame basis, and/or on a "temporal compression" basis wherein each frame is the most common video compression algorithms in conventional use are based on several mathematic principles, including the following: Discrete Cosine Transforms ("DCT"), Wavelet Transforms and Pure Fractals.

"Discrete Cosine Transforms" or "DCT's" are by far the most popular transforms used for image compression applications. In general, DCT is a technique for representing waveform data as a weighted sum of cosines. The DCT is similar to the discrete Fourier transform: it transforms a signal or image from the spatial domain to the frequency domain. The DCT helps separate the image into parts (or spectral sub-bands) of differing importance (with respect to the image's visual quality). Reasons for its popularity include not only good performance in terms of energy compaction for typical images but also the availability of several fast algorithms. DCTs are used in two international image/video compression standards, JPEG and MPEG.

"Wavelet transforms" are generally mathematical algorithms that convert signal data into a set of mathematical expressions that can then be decoded by a destination receiver device, such as for example in a manner similar to Fourier transform. Wavelets have been observed to enhance recovery of weak signals from noise, and therefore images processed in this manner can be enhanced without significant blurring or muddling of details. For this reason, wavelet signal processing has been particularly applied to X-ray and magnetic-resonance images in medical applications. In Internet communications, wavelets have been used to compress images to a greater extent than is generally possible with other conventional methods. In some cases, the wavelet-compressed image can be as small as about 25 percent the size of a similar quality image using the more familiar JPEG format, which is discussed in further detail elsewhere in this disclosure. Thus, for example, a photograph that requires 200 Kb and takes a minute to download in JPEG format may require only 50 Kb and take only 15 seconds to download in wavelet-compressed format. A wavelet-compressed image file is often given a name suffix ".wif", and either the receiver (e.g. Internet browser on a computer receiver) must support these format specific files, or a plug-in program will be required to read such file.

Fractal image compression is a modern technique of lossy image coding that provides several improvements over existing Fourier series compression schemes. Edge depiction is improved since, when modeled as a step function, edges require a large number of Fourier series terms to properly depict. Other advantages of fractals include fast decoding time and scale independence. Fractal compression is based on Mandelbrot sets which take advantage of a self similar, scaling dependent, statistical feature of nature (Mandelbrot, 1983). Fractal compression and decompression involves a clustering approach to find regions which show the same characteristics as a sample region independent of rotation and scale. The fractal image compresses images as recursive equations and instructions about how to reproduce them. The equations describe the image in terms of the relationships between its components. The reduction in storage need is due to the fact that fractal compression saves equations and instructions instead of a pixel representation of the image.

"MPEG" is an acronym for Moving Picture Experts Group and has come to be used synonymously with certain evolving video and audio compression standards promulgated therefrom. In general, to use MPEG video files, a personal computer is required with sufficient processor speed, internal memory, and hard disk space to handle and play the typically large MPEG file, usually given the name suffix ".mpg". A specified MPEG viewer or client software that plays MPEG files must be available on the client system, and generally can be downloaded shareware or versions of commercial MPEG players from various sites on the Web. The modes of operation for MPEG formatted media are herein described by reference to these sequentially evolved standards as follows.

More specifically, MPEG-1 standard was designed for coding progressive video generally at a transmission rate of about 1.5 Mbps. This was generally designed for the specific application for Video-CD and CD-I media. MPEG-1 audio layer-3 ("MP3") has also evolved from early MPEG work. "MPEG-2" is a standard generally designed for coding interlaced images at transmission rates above 4 Mbps, and was generally intended for use with digital TV broadcast and digital versatile disk. Though it is generally observed that many MPEG-2 players can handle MPEG-1 data as well, the opposite is not generally observed to be true and MPEG-2 encoded video is generally incompatible with MPEG-1 players. Yet another progressive standard, "MPEG-3", has also been proposed for use with high definition television ("HDTV"), though in general MPEG-3 has merged with MPEG-2 which is generally believed to meet the HDTV requirements. Finally, an "MPEG4" standard has also been most recently developed and is intended to provide a much more ambitious standard to address speech and video synthesis, fractal geometry, and computer visualization, and has further been disclosed to incorporate artificial intelligence in order to reconstruct images.

MPEG-1 and -2 standards define techniques for compressing digital video by factors varying from 25:1 to 50:1. This compression is achieved according to these standards generally using five different compression techniques: (i) discrete cosine transform (DCT), which is a frequency-based transform; (ii) "quantization", which is a technique for losing selective information, e.g. lossy compression, that can be acceptably lost from visual information; (iii) "Huffman" coding, which is a technique of lossless compression that uses code tables based on statistics about the encoded data; (iv) "motion compensated predictive coding", wherein differences in what has changed between an image and its preceding image are calculated and only the differences are encoded; and (v) "bi-directional prediction", wherein some images are predicted from the pictures immediately preceding and following the image.

Further more detailed examples of commercially available video compression technologies include: Microsoft Media Player™ (available from Microsoft Corporation), RealPlayer™ or RealSystem G2™ (commercially available from Real Networks™), Apple's QuickTime™ (commercially available from Sorenson™); and "VDO". The Microsoft Media Player™ is generally believed to apply the MPEG standard of CODEC for compression/decompression, whereas the others have been alleged to use proprietary types of CODECS. Standard compression algorithms, such as MPEG4, have made their way into the hands of developers who are building embedded systems for enterprise streaming, security, and the like.

One example of a more recent effort to provide streaming video solutions over Wireless and IP networks has been publicized by a company named Emblaze Systems (LSE: BLZ). This company has disclosed certain technology that is intended for encoding and playback of live and on-demand video messages and content on any platform: PC's, PDA's, Video cell phones and Interactive TV. Emblaze Systems is believed to be formerly GEO Interactive Media Group. The following Published International Patent Applications disclose certain streaming media compression technologies that is believed to be related to Emblaze Systems to the extent that GEO Interactive Media Group is named as "Assignee": WO9731445 to Carmel et al.; and WO9910836 to Carmel. The disclosures of these references are herein incorporated in their entirety by reference thereto.

Another company that has published CODEC technology that is intended to improve communication of streaming media for wireless applications is Packetvideo™ Corporation, more specifically intending to communicate streaming video to cellular phones. In addition, they are believed to be promoting CODEC technology that is intended to track temporal scalability and signal error resistance in order to protect video and audio streams from the hazards of the wireless environment. U.S. Pat. No. 6,167,092 to Lengwehasatit discloses further examples of certain streaming media compression/decompression technology that are believed to be associated with Packetvideo as the named "Assignee" on the face of this Patent reference. The disclosure of this patent reference is herein incorporated in its entirety by reference thereto.

Another prior reference discloses CODEC technology that is intended to provide a cost effective, continuously adaptive digital video system and method for compressing color video data for moving images. The method involves capturing an analog video frame and digitizing the image into a preferred source input format for compression using a combination of unique lossy and lossless digital compression techniques including sub-band coding, wavelet transforms, motion detection, run length coding and variable length coding. The system includes encoder and decoder (CODEC) sections, generally disclosed to use a "Huffman" encoder, for compression and decompression of visual images to provide high compression that is intended to provide good to excellent video quality. The compressed video data provides a base video layer and additional layers of video data that are multiplexed with compressed digital audio to provide a data stream that can be packetized for distribution over inter or intranets, including wireless networks over local or wide areas. The CODEC system disclosed is intended to continuously adjust the compression of the digital images frame by frame in response to comparing the available bandwidth on the data channel to the available bandwidth on the channel for the previous frame to provide an output data stream commensurate with the available bandwidth of the network transmission channel and with the receiver resource capabilities of the client users. The compression may be further adjusted by adjustment of the frame rate of the output data stream.

Further more detailed examples of CODEC systems that are intended for use at least in part for streaming video communication are disclosed in the following U.S. Pat. No. 6,081,295 to Adolph et al.; U.S. Pat. No. 6,091,777 to Guetz et al.; U.S. Pat. No. 6,130,911 to Lei; U.S. Pat. No. 6,173,069 B1 to Daly et al.; U.S. Pat. No. 6,263,020 B1 to Gardos et al.; U.S. Pat. No. 6,272,177 to Murakami et al.; and U.S. Pat. No. 6,272,180 B1 to Lei. The disclosures of these references are herein incorporated in their entirety by reference thereto.

Most if not all prior streaming video compression methodologies look to the extremely complex mathematical tools within such CODECS, and subtle changes to them, to carry "one size fits all" video over public and private networks of all types, from ultra-low bandwidth networks such as that found in wireless networks, to satellite communications to ultra-high speed fiber optic installations. Among the various conventional methods of compression, there are generally user-definable parameters, including tradeoffs between image size, frame rate, color depth, contrast, brightness, perceived frame quality, buffer length, etc. Further, within the algorithms themselves there are numerous non-user definable qualities and weighted calculations. It is up to the developers to set these one time for one "general" interest, and then package and ship the product.

However, while the video streaming market continues to grow rapidly, the world has not chosen one standard for compression as no one algorithm is ideal for all video sources, destinations, or transmission modalities. While a first CODEC may be best for one type of signal, or for a first portion of a signal (e.g. frame or scene comprising a series of frames), another second CODEC may be best for another type of signal, or even another second portion of the same signal. Still further, one CODEC may be best suited for compression/decompression of a particular streaming signal among send, receive, and transmission devices in a communications network; another second CODEC may be better suited than the first for the same streaming media signal but for another set of communication device parameters. For example, some video streams may deliver color to handheld devices while other video streams can take advantage of the loss of pixels in a black and white transmission to a cellular phone to increase frame rate. Required sound quality, frame rates, clarity, and buffering tolerance all decidedly impact the compression algorithm of choice for optimized video and audio delivery across multiple platforms.

In fact, certain communication device parameters may be sufficiently transient during the streaming media transmission such that an initially appropriate CODEC for an initial set of parameters may be rendered less efficient than another CODEC due to changes in those parameters during the same streamed signal transmission. Examples of such transient parameters include, without limitation: available band width in the data transmission channel, available memory or processing power in either the send or receiving devices, and dedicated display resolution/window in the receiving device (e.g. minimizing windows on a screen). These problems are compounded exponentially by a vast number of iterations of different combinations of such factors that may differentiate one CODEC from another as being most efficient for compression, decompression, and delivery of a specific streaming media signal along a particular communications device system.

As CODEC systems are "format-specific", source and destination devices must be "pre-configured" to communicate media signals between each other according to common, specific compression/decompression modalities, else transcoders must be used. However, even if conventional transcoders are used, constraints in the communication system (e.g. source, transmission channel, destination device) are not generally considered and the communication may be significantly faulty. For the purpose of further illustration, FIGS. 1A and 1B show two different schematic representations of conventional methods for communicating media between source 110-120 and destination devices 130-140.

These illustrations specifically exemplify streaming video communication, though other media forms may be represented by similar systems.

It has been observed that CODEC algorithms can generally be modified for a specific application and then perform better than a similar unmodified set over that limited example. However, this generally must be done either for a series of frames, or ideally, for each individual frame. Some DCT based algorithms have as many as two billion mathematical operations occurring for each frame at higher resolutions and lower perceived quality. This is entirely too much math for average machines, even commercial servers, to perform thirty to sixty times in a single second. This is the reason for the advent of the dedicated compression board or ASIC.

Audio CODECS

In addition to society's recent interests in improving video compression, audio compression has likewise been the topic of significant efforts also for various live or pre-recorded applications, including audio broadcast, music, transmission synchronized with video, live interactive voice (e.g. telephone). Any and all of these audio compression applications must be compatible with a wide range of client-side receiver/players, such as on a multitude of handheld or desk-top devices having widely varied capabilities and operating parameters.

Conventional audio CODECS generally comprise several different types, a few of which are herein briefly summarized for the purpose of illustration.

"Code Excited Linear Prediction" or "CELP" is a type of speech compression method using waveform CODECS that use "Analysis-by-Synthesis" or "AbS" within the excitation-filter framework for waveform matching of a target signal. CELP-based CODECS have recently evolved as the prevailing technique for high quality speech compression, and has been published to transmit compressed speech of toll-quality at data rates nearing as low as about 6 kbps. However, at least one publication discloses that the quality of CELP coded speech is reduced significantly for bit rates at or below 4 kbps.

"Vocoders" are speech CODECS that are not based on the waveform coding scheme, but rather use a quantized parametric description of the target input speech to synthesize the reconstructed output speech. Vocoders have been disclosed to deliver better speech quality at low bit-rates, such as about 4 kbps, and have been developed for such applications. Low bit rate vocoders use the periodic characteristics of voiced speech and the "noise-like" characteristics of stationary unvoiced speech for speech analysis, coding and synthesis. Some early versions of vocoders (e.g. federal standard 1015 LPC-10, use a time-domain analysis and synthesis method. However, most of the more recent versions, which at least one publication labels "harmonic coders", utilize a harmonic spectral model for voiced speech segments.

Notwithstanding the previous description of certain specific speech compression techniques, a vast number of speech CODECs and standards have been developed by industry and managed by industry and nonprofit groups. Examples of such groups include without limitation the following, and their standards are often used as reference types of CODECS: the European Telecommunications Standards Institute ("ETSI"); the Institute of Electrical and Electronics Engineers ("IEEE"); and the International Telecommunication Union Telecommunications Standards Sector ("ITU-T"), formerly the "CCWI".

One more recently disclosed method and apparatus for hybrid coding of speech, specified at 4 Kbps, encodes speech for communication to a decoder for reproduction of the speech where the speech signal is classified into three types: (i) steady state voiced or "harmonic"; (ii) stationary unvoiced; and (iii) "transitory" or "transition" speech. A particular type of coding scheme is used for each class. Harmonic coding is used for steady state voiced speech, "noise-like" coding is used for stationary unvoiced speech, and a special coding mode is used for transition speech, designed to capture the location, the structure, and the strength of the local time events that characterize the transition portions of the speech. The compression schemes are intended to be applied to the speech signal or to the LP residual signal.

Another recently disclosed method and arrangement for adding a new speech encoding method to an existing telecommunication system is also summarized as follows. A CODEC is introduced into a speech transmitting transceiver of a digital telecommunications system in order to use a "new" CODEC and an "old" CODEC in parallel in the system. A CODEC is selected by implementing a handshaking procedure between transceivers where a speech encoding method is implemented in all transceivers and previously used in the telecommunications system concerned. The handshaking is used at the beginning of each connection. At the beginning of a phone call and after handover, the method checks whether both parties can also use the new speech encoding. The handshaking messages have been selected so that their effect on the quality of speech is minimal, and yet so that the probability of identifying the messages is maximal.

Still another relatively recent reference discloses a tunable perceptual weighting filter for tandem CODECS intended for use in speech compression. Specific filter parameters are tuned to provide improved perfromance in tandeming contexts. More specifically, the parameters used are $10^{th}$ order LPC predictor coefficients. This system is specified to use "Low-Delay Excited Linear Predictive" CODECS, or "LD-CELP".

Further more detailed examples of streaming audio communications systems using CODECS such as according to the examples just described are provided in the following US Patent references: U.S. Pat. No. 6,144,935 to Chen et al.; U.S. Pat. No. 6,161,085 to Haavisto et al.; and U.S. Pat. No. 6,233,550 to Gersho. The disclosures of these references are herein incorporated in their entirety by reference thereto.

Artificial Intelligence ("AI") and Neural Networks with CODECS

Various systems and methods have been recently disclosed that are intended to integrate artificial intelligence ("AI") or neural networks with the compression and decompression of streaming media signals.

The terms "artificial intelligence" are herein intended to mean the simulation of human intelligence processes by computer systems, including learning (the acquisition of information and rules for using the information), reasoning (using the rules to reach approximate or definite conclusions), and self-correction. Particular applications of AI include "expert systems", which are computer programs that simulate judgment and behavior of a human or organization that has expert knowledge and experience in a particular field. Typically, expert systems contain a knowledge base to each particular situation that is described to the program, and can be enhanced with additions to the knowledge base or to the set of rules.

The terms "neural network" are herein intended to mean a system of programs and data structures that approximates the operation of the human brain, usually involving a large number of processors operating in parallel, each with its own small sphere of knowledge and access to data in its local memory. Typically, a neural network is initially trained or fed large amounts of data and rules about data relationships, after which a program can tell the network how to behave in response to an external stimulus (e.g. input information). In making determinations, neural networks use several principles, including without limitation gradient-based training and fuzzy logic. Neural networks may be further described in terms of knowledge layers, generally with more complex networks having deeper layers. In "feedforward" neural network systems, learned relationships about data can "feed forward" to higher layers of knowledge. Neural networks can also learn temporal concepts and have been widely used in signal processing and time series analysis. Other published applications of neural networks include oil exploration data analysis, weather prediction, the interpretation of nucleotide sequences in biology labs, and the exploration of models of thinking and consciousness.

The terms "fuzzy logic" are herein intended to mean an approach to computing based upon "degrees of truth" rather than "Boolean logic" which operates within only a true/false (or "binary", as 1 or 0) domain. Fuzzy logic was first advanced by Dr. Lotfi Zadeh of the University of California at Berkeley in the 1960's in relation to work on a problem of computer understanding of natural language, which is not easily translated into absolute Boolean logic terms. Fuzzy logic often does include the cases of 0 and 1 as extreme cases of truth, but also includes the various states of truth in between (e.g. a determination of that the state of being is at some threshold, such as 0.98, may assists in making a decision to assign a 1 with an acceptably low occurrence of error in an operation).

One example of a previously disclosed streaming media compression/decompression system intended to use with artificial intelligence through a neural network uses a Radon transform in order to compress data such as video data. Several previously disclosed AI and/or neural network systems are intended to use AI and/or neural networks for the purpose of error correction during use of certain specified lossless compression CODECS. For example, a learning system is employed to determine a difference between what was received by a receiver after compression and transmission and what is predicted to have been received at the transmission end. That difference is processed as learning to modify the tuning of the CODEC for an additional transmission.

Another example of a disclosed method and device is intended to extrapolate past signal-history data for insertion into missing data segments in order to conceal digital speech frame errors. The extrapolation method uses past-signal history that is stored in a buffer. The method is implemented with a device that is disclosed to utilize a finite-impulse response ("FIR"), multi-layer, feed-forward, artificial neural network that is trained by back-propagation for one-step extrapolation of speech compression algorithm ("SCA") parameters. Once a speech connection has been established, the speech compression algorithm device begins sending encoded speech frames. As the speech frames are received, they are decoded and converted back into speech signal voltages. During the normal decoding process, pre-processing of the required SCA parameters will occur and the results stored in the past-history buffer. If a speech frame is detected to be lost or in error, then extrapolation modules are executed and replacement SCA parameters are generated and sent as the parameters required by the SCA. In this way, the information transfer to the SCA is intended to be transparent, and the SCA processing continues as usual. This disclosure alleges that the listener will not normally notice that a speech frame has been lost because of the smooth transition between the last-received, lost, and next-received speech frames.

Further more detailed examples of systems that are intended to use artificial intelligence and/or neural networks in systems for media compression and/or decompression, generally relating to media type-specific CODEC methods (e.g. speech, video), are variously disclosed in the following US Patent References: U.S. Pat. No. 5,005,206 to Naillon et al.; U.S. Pat. No. 5,041,916 to Yoshida et al.; U.S. Pat. No. 5,184,218 to Gerdes; U.S. Pat. No. 5,369,503 to Burel et al.; U.S. Pat. No. 5,598,354 to Fang et al.; U.S. Pat. No. 5,692,098 to Kurdziel; U.S. Pat. No. 5,812,700 to Fang et al.; U.S. Pat. No. 5,872,864 to Imade et al.; U.S. Pat. No. 5,907,822 to Prieto, Jr.; and U.S. Pat. No. 6,216,267 to Mitchell. Still further examples are provided in the following Published International Patent Applications: WO 01/54285 to Rising; EPO 0372608 A1 to Naillon et al. The disclosures of all these references cited in this paragraph are herein incorporated in their entirety by reference thereto.

Other disclosures of CODEC systems using feedback or other systems for operating CODECS for use in processing a variety of streaming media signals, but that are not believed to specifically use the labels "AI" or "neural networks", are disclosed in the following U.S. Pat. No. 6,072,825 to Betts et al.; U.S. Pat. No. 6,182,034 B1 to Malvar; U.S. Pat. No. 6,253,165 B1 to Malvar; U.S. Pat. No. 6,256,608 B1 to Malvar. The disclosures of these references are herein incorporated in their entirety by reference thereto.

Notwithstanding the significant advancements in CODEC algorithms themselves, and despite prior intended uses of AI and other feedback systems for operating CODECS in order to improve compression efficiencies in communication, there is still a need for significant improvement in the ability to efficiently provide a wide variety of streaming media signals to a wide variety of destination receiver devices over a wide variety of transmission channels with varied bandwidths and communication protocols.

There is still a need to incorporate AI and/or neural networks to apply an appropriate CODEC for communication of a streaming media signal based upon a variety of parameters, including without limitation one or more of the following: (a) the automated choosing of an appropriately optimized CODEC from a library of available CODECS of different types and operation, including in particular based upon an intelligent knowledge of the chosen CODEC's operation compared to the other CODEC's operation and/or against a standard, (b) a pre-trained and/or iteratively learned knowledge of the particular CODEC's operation within a given set of operating parameters representative of the existing situation; and (c) a tuning of the appropriate CODEC based upon an intelligent knowledge of its operation with respect to either or both of the existing situation or a test situation with reference parameters.

In particular, there is still a need for such an intelligent CODEC system that bases an applied CODEC upon an existing situation that is defined by one or more of the following: parameters of the streaming media signal itself; parameters of the transmission channel capabilities and constraints; and parameters of the receiver device capabilities and constraints.

Still further, there is also still a need for such an intelligent CODEC system that operates based upon an intelligent knowledge with respect to all of these operations and situational parameters in order to optimize the appropriate compression, transmission, decompression, and playing of the subject streaming media signal.

Conventional Transcoders for Streaming Media

Also of recent interest in the field of streaming media communication is providing intercommunication between the wide array of "format-specific" encoding systems in present use. An existing field of various different format-specific systems and pre-encoded content has created a widely fragmented ability to process encoded content, resulting in a significant quagmire of compatibility issues between content providers and client users. If one client desires to see or hear streaming content from a particular source and that content must be put through a CODEC for compression, a compatible LO CODEC must be used on the client side for decompression to enjoy the signal. Unfortunately, source content is often married to only a few, and often only one, specific CODEC schemes. Therefore, if a client requests such encoded content (or if the source desires to push the encoded content to a particular client), one of two criteria must be met: (1) the client must download or otherwise possess the format-specified CODEC (decoder); or (2) the source media must be put through a "transcoder" in order to decode the source media from the first format into a second format that is compatible with the client's device/system. The term "transcoder" is herein intended to mean a system that converts a media signal from one encoded (i.e. compressed) format to another.

Various techniques for transcoding one media format into another have been previously disclosed. FIG. 1C shows one illustrative example of the general process that is characteristic of many known transcoding techniques. More specifically, a request 159 is first received from a particular type of device or player for content that exists in an initial, uncompatible format. According to the specific example shown in FIG. 1C, a request 159 from a Microsoft Media™ Player for Real™ Video Content is received. As the content is specifically requested, the content is decoded from the initial format (e.g. Real-encoded format), and is then "re-encoded" into the appropriate format for the requesting player (e.g. Microsoft Media™ format). This re-encoded media is then served to the requesting client for decoding within the resident system of that player.

This conventional system has significant scalability limitations, in that simultaneous feeds on multiple channels for multiple clients must be supported by an equal number of transcoders. For example, FIG. 1D shows a schematic implementation of the conventional transcoding technique just described as it manages four simultaneous stream requests from four Microsoft Media Players, wherein the requested content is initially encoded in Real™ format. The system architecture necessary to support the four encoders 151-154 and four decoders 155-158 requires significant computing resources. For example, it is believed that each encoder 151-154 provided in the example requires a computer having a 600 MHz (e.g. Pentium™ III) having 128 Mbytes of RAM available, or dual 400 MHz processors (e.g. Pentium II) with 256 Mb available RAM. It is further believed that each decoder 155-158 needs a 233 MHz machine (e.g. Pentium™ II) having 64 Mb of available RAM. So, four such streams requires the equivalent of a Quad 900 Xeon (available from Compaq, Hewlett Packard, Dell and IBM, estimated to cost at the time of this disclosure about $9K retail). This is for four simultaneous streams—society is presently demanding thousands upon thousands of simultaneous streams.

There is still a need for a transcoder system that efficiently converts multiple format-specifically encoded streaming media signals into multiple other formats using minimal computing resources and in a cost-efficient manner.

Parameters Affecting Media Communication

For the purpose of further illustrating the many variables that may impact the choice of an appropriate CODEC in order to communicate a particular streaming media signal to a desired target, the following is a brief summary of various different types of streaming video formats and processing systems. It is believed that these different systems each generally require different types of compression modalities (e.g. CODECS) in order to optimize communication and playing of streaming media signals in view of available transmission speeds and bandwidth, as well as receiver processing parameters.

Although certain specific types of communications formats and systems are further herein described in detail, the following Table 1 provides a summary of a significant cross-section of the various different communications systems and transmission carriers currently available or disclosed in view of available speed or bandwidth.

TABLE 1

Data Rates of Various Communications Carrier systems

| Technology | Speed | Physical Medium | Application |
|---|---|---|---|
| GSM mobile telephone service | 9.6 to 14.4 Kbps | RF in space (wireless) | Mobile telephone for business and personal use |
| High-Speed Circuit-Switched Data service (HSCSD) | Up to 56 Kbps | RF in space (wireless) | Mobile telephone for business and personal use |
| Regular telephone service (POTS) | Up to 53 Kbps | Twisted pair | Home and small business access |
| Dedicated 56 Kbps on Frame Relay | 56 Kbps | Various | Business e-mail with fairly large file attachments |
| DS0 | 64 Kbps | All | The base signal on a channel in the set of Digital Signal levels |
| General Packet Radio System (GPRS) | 56 to 114 Kpbs | RF in space (wireless) | Mobile telephone for business and personal use |
| ISDN | BRI: 64 Kbps to 128 Kbps PRI: 23 (T-1) or 30 (E1) assignable 64-Kbps channels plus control channel; up to 1.544 Mbps (T-1) or 2.048 (E1) | BRI: Twisted-pair PRI: T-1 or E1 line | BRI: Faster home and small business access PRI: Medium and large enterprise access |
| IDSL | 128 Kbps | Twisted-pair | Faster home and small business access |
| Apple Talk | 230.4 Kbps | Twisted pair | Local area network for Apple devices; several networks can be bridged; non-Apple devices can also be connected |
| Enhanced Data GSM Ennvironment (EDGE) | 384 Kbps | RF in space (wireless) | Mobile telephone for business and personal use |
| Satellite | 400 Kbps (DirecPC and others) | RF in space (wireless) | Faster home and small enteprise access |
| Frame relay | 56 Kbps to 1.544 Mbps | Twisted-pair or coaxial cable | Large company backbone for LANs to ISP ISP to Internet infrastructure |
| DS1/T-1 | 1.544 Mbps | Twisted-pair, coaxial cable, or optical fiber | Large company to ISP ISP to Internet infrastructure |
| Universal Mobile Telecommunications Service | Up to 2 Mbps | RF in space (wireless) | Mobile telephone for business and personal use (available in 2002 or later) |

TABLE 1-continued

Data Rates of Various Communications Carrier systems

| Technology | Speed | Physical Medium | Application |
| --- | --- | --- | --- |
| (UMTS) | | | |
| E-carrier | 2.048 Mbps | Twisted pair, coaxial cable, or optical fiber | 32-channel European equivalent of T-1 |
| T-1C (DS1C) | 3.152 Mbps | Twisted pair, coaxial cable, or optical fiber | Large company to ISP ISP to Internet infrastructure |
| IBM Token Ring/802.5 | 4 Mbps (also 16 Mbps) | Twisted pair, coaxial cable, or optical fiber | Second most commonly-used local area network after Ethernet |
| DS2/T-2 | 6.312 Mbps | Twisted pair, coaxial cable, or optical fiber | Large company to ISP ISP to Internet infrastructure |
| Digital Subscriber Line (DSL) | 512 Kbps to 8 Mbps | Twisted pair (used as a digital, broadband medium) | Home, small business, and enterprise access using existing copper lines |
| E-2 | 8.448 Mbs | Twisted pair, coaxial cable, or optical fiber | Carries four multiplexed E-1 signals |
| Cable modem | 512 Kbps to 52 Mbps (see "Key and explanation" below) | Coaxial cable (usually uses Ethernet); in some systems, telephone used for upstream requests | Home, business, school access |
| Ethernet | 10 Mbps | 10BASE-T (twisted-pair); 10BASE-2 or -5 (coaxial cable); 10BASE-F (optical fiber) | Most popular business local area network (LAN) |
| IBM Token Ring/802.5 | 16 Mbps (also 4 Mbps) | Twisted pair, coaxial cable, or optical fiber | Second most commonly-used local area network after Ethernet |
| E-3 | 34.368 Mbps | Twisted pair or optical fiber | Carries 16 E-1 signals |
| DS3/T-3 | 44.736 Mbps | Coaxial cable | ISP to Internet infrastructure Smaller links within Internet infrastructure |
| OC-1 | 51.84 Mbps | Optical fiber | ISP to Internet infrastructure Smaller links within Internet infrastructure |
| High-Speed Serial Interface (HSSI) | Up to 53 Mbps | HSSI cable | Between router hardware and WAN lines Short-range (50 feet) interconnection between slower LAN devices and faster WAN lines |
| Fast Ethernet | 100 Mbps | 100BASE-T (twisted pair); 100BASE-T (twisted pair); 100BASE-T(optical fiber) | Workstations with 10 Mbps Ethernet cards can plug into a Fast Ethernet LAN |
| Fiber Distributed-Data Interface (FDDI) | 100 Mbps | Optical fiber | Large, wide range LAN usually in a large company or a larger ISP |
| T-3D (DS3D) | 135 Mbps | Optical fiber | ISP to Internet infrastructure Smaller links within Internet infrastructure |
| E-4 | 139.264 Mbps | Optical fiber | Carries 4 E3 channels Up to 1,920 simultaneous voice conversations |
| OC-3/SDH | 155.52 Mbps | Optical fiber | Large company backbone Internet backbone |
| E-5 | 565.148 Mbps | Optical fiber | Carries 4 E4 channels Up to 7,680 simultaneous voice conversations |
| OC-12/STM-4 | 622.08 Mbps | Optical fiber | Internet backbone |
| Gigabit Ethernet | 1 Gbps | Optical fiber (and "copper" up to 100 meters | Workstations/networks with 10/100 Mbps Ethernet plug into Gigabit Ethernet switches |
| OC-24 | 1.244 Gbps | Optical fiber | Internet backbone |
| SciNet | 2.325 Gbps (15 OC-3 lines) | Optical fiber | Part of the vBNS backbone |
| OC-48/STM-16 | 2.488 Gbps | Optical fiber | Internet backbone |
| OC-192/STM-64 | 10 Gbps | Optical fiber | Backbone |
| OC-256 | 13.271 Gbps | Optical fiber | Backbone |

Comments & Key for Table:
(i)The term "Kbps" as the abbreviation for "thousands of bits per second." In international English outside the U.S., the equivalent usage is "kbits s$^{-1}$" or "kbits/s".
(ii) Engineers use data rate rather than speed, but speed (as in "Why isn't my Web page getting here faster?") seems more meaningful for the less technically inclined.
(iii) Relative to data transmission, a related term, bandwidth or "capacity," means how wide the pipe is and how quickly the bits can be sent down the channels in the pipe. These "speeds" are aggregate speeds. That is, the data on the multiple signal channels within the carrier is usually allocated by channel for different uses or among different users.
Key: (i) "T" = T-carrier system in U.S., Canada, and Japan . . . (ii) "DS" = digital signal (that travels on the T-carrier or E-carrier) . . . (iii) "E" = Equivalent of "T" that uses all 8 bits per channel; used in countries other than U.S. Canada, and Japan . . . (iv) "OC" = optical carrier (Synchronous Optical Network) "STM" = Synchronous Transport Modules (see Synchronous DigitalHeirarchy). (v) Only the most common technologies are shown. (vi) "Physical medium" is stated generally and doesn't specify the classes or numbers of pairs of twisted pair or whether optical fiber is single-mode or multimode. (vii) The effective distance of a technology is not shown. (viii) There are published standards for many of these technologies.
Cable modem note: The upper limit of 52 Mbps on a cable is to an ISP, not currently to an individual PC. Most of today's PCs are limited to an internal design that can accommodate no more than 10 Mbps (although the PCI bus itself carries data at a faster speed). The 52 Mbps cable channel is subdivided among individual users. Obviously, the faster the channel, the fewer channels an ISP will require and the lower the cost to support an individual user.

Internet Carrier Systems

Communication of streaming video via the Internet may take place over a variety of transmission modalities, including for example digital subscriber lines ("DSL"), "T1" lines, cable modem, plain old telephone service ("POTS") dial-up modem, and wireless carriers. While a description of the many different wireless transmission modalities is treated separately herein, a summary of various of these other transmission modes is herein provided immediately below for the purpose of further illustration as follows.

The terms "POTS" or "plain old telephone service", or "dial-up", as applied to communications transmission channels, are herein interchangeably used. These terms are intended to mean "narrow-band" communication that generally connects end users in homes or small businesses to a telephone company office over copper wires that are wound around each other, or "twisted pair". Traditional phone service was created to let you exchange voice information with other phone users via an analog signal that represents an acoustic analog signal converted into an electrical equivalent in terms of volume (signal amplitude) and pitch (frequency of wave change). Since the telephone company's signaling is already set up for this analog wave transmission, it's easier for it to use that as the way to get information back and forth between your telephone and the telephone company. Therefore, dial-up modems are used to demodulate the analog signal and turn its values into the string of 0 and 1 values that is called digital information. Because analog transmission only uses a small portion of the available amount of information that could be transmitted over copper wires, the maximum amount of data that you can receive using ordinary modems is about 56 Kbps. The ability of your computer to receive information is constrained by the fact that the telephone company filters information that arrives as digital data, puts it into analog form for your telephone line, and requires your modem to change it back into digital. In other words, the analog transmission between your home or business and the phone company is a bandwidth bottleneck.

With "ISDN", or "Internet subscriber digital network", which some consider to be a limited precursor to DSL, incoming data rates up to about 128 Kbps may be achieved for some end user clients.

A "DSL" or "digital subscriber line" is generally defined as a "broadband" transmission carrier for communicating high-bandwidth communication over ordinary copper telephone lines. Many different types of DSL services have been disclosed, having generally varied data rates and intended applications. Though further discussion is herein provided about certain of these DSL types, the following Table 2 provides a summary of information for certain of these DSL types for the purpose of further developing an overview understanding:

TABLE 2

Types of known DSL services.

| DSL Type | Description | Data Rate Downstream; Upstream | Distance Limit | Application |
|---|---|---|---|---|
| IDSL | ISDN Digital Subscriber Line | 128 Kbps | 18,000 feet on 24 gauge wire | Similar to the ISDN BRI service but data only (no voice on the same line) |
| CDSL | Consumer DSL from Rockwell | 1 Mbps downstream; less upstream | 18,000 feet on 24 gauge wire | Splitterless home and small business service; similar to DSL Lite |
| DSL Lite (same as G.Lite) | "Splitterless" DSL without the "truck roll" | From 1.544 Mbps to 6 Mbps downstream, depending on the subscribed service | 18,000 feet on 24 gauge wire | The standard ADSL; sacrifices speed for not having to install a splitter at the user's home or business |
| G.Lite (same as DSL Lite) | "Splitterless" DSL without the "truck roll" | From 1.544 Mbps to 6 Mbps, depending on the subscribed service | 18,000 feet on 24 gauge wire | The standard ADSL; sacrifices speed for not having to install a splitter at the user's home or business |
| HDSL | High bit-rate Digital Subscriber Line | 1.544 Mbps duplex on two twisted-pair lines; 2.048 Mbps duplex on three twisted-pair lines | 12,000 feet on 24 gauge wire | T1/E1 service between server and phone company or within a company; WAN, LAN, server access |
| SDSL | Symmetric DSL | 1.544 Mbps duplex (U.S. and Canada); 2.048 Mbps (Europe) on a single duplex line downstream and upstream | 12,000 feet on 24 gauge wire | Same as for HDSL but requiring only one line of twisted-pair |
| ADSL | Asymmetric Digital Subscriber Line | 1.544 to 6.1 Mbps downstream; 16 to 640 Kbps upstream | 1.544 Mbps at 18,000 feet; 2.048 Mbps at 16,000 feet; 6.312 Mpbs at 12,000 feet; 8.448 Mbps at 9,000 feet | Used for Internet and Web access, motion video, video on demand, remote LAN access |
| RADSL | Rate-Adaptive DSL from Westell | Adapted to the line, 640 Kbps to 2.2 Mbps downstream; 272 Kbps to 1.088 Mbps upstream | Not provided | Similar to ADSL |
| UDSL | Unidirectional DSL proposed by a company in Europe | Not known | Not known | Similar to HDSL |
| VDSL | Very high Digital Subscriber Line | 12.9 to 52.8 Mbps downstream; 1.5 to 2.3 Mbps upstream; 1.6 Mbps to 2.3 Mbps downstream | 4,500 feet at 12.96 Mbps; 3,000 feet at 25.82 Mbps; 1,000 feet at 51.84 Mbps | ATM networks; Fiber to the Neighborhood |

Typically published data rates for DSL service, which may vary depending upon distance from the central office of the offering service company, includes rates up to 6.1 Mbps (theoretically published at 8.448 Mbps), which is believed to enable continuous transmission of motion video, audio, and 3-D effects. More typical individual connections provide from 512 Kbps to 1.544 Mbps downstream and about 128 Kbps upstream. A DSL line can carry both data and voice signals and the data part of the line is continuously connected. DSL has been anticipated in some publications to replace ISDN in many areas and to compete with cable modem for multimedia communication to homes and businesses. DSL operates purely within the digital domain and does not require change into analog form and back. Digital data is transmnitted to destination computers directly as digital data and this allows the phone company to use a much wider bandwidth for forward transmission. Meanwhile, if a client user chooses, the signal can be separated so that some of the bandwidth is used to transmit an analog signal so that a telephone and computer may be used on the same line and at the same time.

Most DSL technologies require that a signal splitter be installed at a home or business, requiring the expense of a phone company visit and installation. However, it is possible to manage the splitting remotely from the central office. This is known as splitterless DSL, "DSL Lite," G.Lite, or Universal ADSL (further defined below) and has recently been made a standard. Several modulation technologies are used by various kinds of DSL, although these are being standardized by the International Telecommunication Union (ITU). Different DSL modem makers are using either Discrete Multitone Technology (DMT) or Carrierless Amplitude Modulation (CAP). A third technology, known as Multiple Virtual Line (MVL), is another possibility.

A variety of parameters of DSL operation are variable and affect the effective data rates that can be achieved. DSL modems generally follow the data rate multiples established by North American and European standards. In general, the maximum range for DSL without a repeater is 5.5 km (18,000 feet). As distance decreases toward the telephone company office, the data rate increases. Another factor is the gauge of the copper wire. The heavier 24 gauge wire carries the same data rate farther than 26 gauge wire. For destination devices beyond the 5.5 kilometer range, DSL may still be provided, though only generally if the respective phone company provider has extended the local loop with optical fiber cable.

To interconnect multiple DSL users to a high-speed network as a "backbone", the telephone company uses a Digital Subscriber Line Access Multiplexer ("DSLAM"). Typically, the DSLAM connects to an asynchronous transfer mode ("ATM") network that can aggregate data transmission at gigabit data rates. At the other end of each transmission, a DSLAM demultiplexes the signals and forwards them to appropriate individual DSL connections.

"ADSL" or "Asymmetric Digital Subscriber Line" is the form of DSL that will become most familiar to home and small business users. ADSL is called "asymmetric" because most of its two-way or "duplex" bandwidth is devoted to the downstream direction, sending data to the user. Only a small portion of bandwidth is available for upstream or user-interaction messages. However, most Internet and especially graphics- or multi-media intensive Web data need lots of downstream bandwidth, but user requests and responses are small and require little upstream bandwidth. Using ADSL, up to 6.1 megabits per second of data can be sent downstream and up to 640 Kbps upstream. The high downstream bandwidth means that a telephone line may carry motion video, audio, and 3-D images to destination computers or television displays. In addition, a small portion of the downstream bandwidth can be devoted to voice rather data, and phone conversations may be carried without requiring a separate line. Unlike a similar service over "cable" television lines, ADSL does not compete for bandwidth with neighbors in a given area. In many cases, your existing telephone lines will work with ADSL. In some areas, they may need upgrading.

"CDSL" or "Consumer DSL" is a trademarked version of DSL, to be made available by Rockwell Corporation, that is somewhat slower than ADSL (1 Mbps downstream, generally predicted to be lower upstream) but has the advantage that a "splitter" does not need to be installed at the user's end. Hardware may be required to carry CDSL by local phone companies to homes or businesses. CDSL uses its own carrier technology rather than DMT or CAP ADSL technology.

Various companies have worked with telephone companies in developing a standard and easier installation version of ADSL, called "G.Lite", that is believed to be under deployment at the time of this disclosure. "G.Lite" or "DSL Lite" (also known as "splitterless ADSL", and "Universal ADSL") is believed to be essentially a slower ADSL that doesn't require splitting of the line at the user end but manages to split it for the user remotely at the telephone company, which is believed to lower costs. G.Lite, officially ITU-T standard G-992.2, is published to provide a data rate from 1.544 Mbps to 6 Mpbs downstream and from about 128 Kbps to about 384 Kbps upstream. At least one publication has predicted G.Lite to become the most widely installed form of DSL.

"HDSL" or "High bit-rate DSL" is believed to be the earliest variation of DSL to be widely used for wideband digital transmission within a corporate site and between the telephone company and a customer. The main characteristic of HDSL is that it is symmetrical: an equal amount of bandwidth is available in both directions. For this reason, the maximum data rate is generally lower than for ADSL. HDSL can carry as much on a single wire of twisted-pair as can be carried on a T1 line in North America or an E1 line in Europe (up to about 2.32 Mbps).

"IDSL" or "ISDN DSL" is somewhat of a misnomer since it's really closer to ISDN data rates and service at about 128 Kbps than compared with the much higher rates generally associated with ADSL.

"RADSL" or "Rate-Adaptive DSL" is an ADSL technology to be made available from Westell company in which software is able to determine the rate at which signals can be transmitted on a given customer phone line and adjust the delivery rate accordingly. Westell's "FlexCap2TM" version system uses RADSL to deliver from about 640 Kbps to about 2.2 Mbps downstream and from about 272 Kbps to about 1.088 Mbps upstream over an existing line.

"SDSL" or "Symmetric DSL" is similar to HDSL with a single twisted-pair line, carrying about 1.544 Mbps (U.S. and Canada) or about 2.048 Mbps (Europe) each direction on a duplex line. It's symmetric because the data rate is the same in both directions. "UDSL" or "Unidirectional DSL" is a proposal from a European company, and is generally believed to provide a unidirectional version of HDSL.

"VDSL" or "Very high data rate DSL" is believed to be a technology under development that promises much higher data rates over relatively short distances, for example between about 51 and about 55 Mbps over lines up to about 1,000 feet or about 300 meters in length. At least one publication has predicted that VDSL may emerge somewhat after ADSL is widely deployed and co-exist with it. The transmission technology (CAP, DMT, or other) and its effectiveness in some environments is not yet determined. A number of standards organizations are working on it.

"x2/DSL" is modem from 3Com that supports 56 Kbps modem communication but is upgradeable through new software installation to ADSL when it becomes available in the user's area. At least one publication cites 3Com as describing this technology to be "the last modem you will ever need."

A "T1" transmission line is generally considered a "broadband" carrier and is defined as a type of "T-carrier" system, which is believed to have been first introduced by the Bell System in the U.S. in the 1960's as the first successful system that supported digitized voice transmission. The T-carrier system is entirely digital, using pulse code modulation and time-division multiplexing. Voice signals are typically sampled at about 8,000 times a second and each sample is digitized into an 8-bit word. With 24 channels digitized at the same time, a 192-bit frame, representing 8-bit words on each of 24 channels, is thus transmitted about 8,000 times a second. Each frame is separated from the next by a single bit, resulting in a 193-bit block. The T-1's published data rate of 1.544 Mbps generally represents the 192 bit frame, and the 1-bit signaling bit, multiplied by 8,000.

A T-1 system typically uses 4 wires and provides duplex capability, with two wires dedicated for receiving and two for sending at the same time. The T-1 digital stream includes 24, 64 Kbps channels that are multiplexed, wherein the standard 64 Kbps channel is based on the bandwidth required for a voice conversation. The four wires were originally a pair of twisted pair copper wires, but more recent systems provide coaxial cable, optical fiber, digital microwave, and other carrier technologies. The number and use of the channels may be varied from the standard guidelines.

The original transmission rate (1.544 Mbps) for T-1 lines is in common use today in Internet service provider ("ISP") connections to the Internet. Another level, the T-3 line, is published to provide 44.736 Mbps, and is also commonly used by Internet service providers. Another commonly used service is "fractional T-1", which is the rental of some portion of the 24 channels in a T-1 line, with the other channels unused.

Display Capabilities/Constraints & Related Standards

Various different types of receiver display capabilities may also significantly impact the appropriate CODEC modality for efficiently communicating particular streaming media signals for display by the receiver. A brief summary of certain examples to illustrate such varied display parameters (e.g. resolution, clarity, color, depth, size, type/format-specific) is provided for a better understanding as follows.

One parameter that is highly variable between different types and makes of streaming media receiver devices, and therefore that may have significant impact on the appropriate CODEC to be used, is the range of colors that may be expressed by a display device, or "palette". A standard "browser-safe" palette, which may be accommodated by most software for Internet-based streaming media display, may include for example about 216 colors, though for web-based streaming media the computer display capability as well as the browser software capability must be understood.

With respect to computer display technology, a color is set for each individual pixel or addressable illumination element on the screen. Each pixel has a red, green, and blue (RGB) component. By specifying the amount of intensity for each of these components, a distinct color is given to that pixel. A "true color" display generally defines the color of a pixel on a display screen using a 24-bit value, allowing the possibility of up to 16,777,216 possible colors. The number of bits used to define a pixel's color shade is called the "bit-depth". True color is sometimes referred to as "24-bit color", though many modern color display systems offer a 32-bit color mode. An extra byte, called the "alpha channel", is typically used for control and special effects information. A "gray scale" (composed of discrete shades of gray) display setting is generally defined as having N bits of depth where N represents the saturation of black within the pixel. If N=1, the image is not called gray scale but instead monochrome, or black and white, as the bit can only be on or off and can contain no shading information.

Common computer resolutions include for example and without limitation the following:
  (i) VGA or Video Graphics Array capable of displaying 640×480 pixels in 16 colors or 320×240 pixels in 256 colors in a 4:3 aspect ratio;
  (ii) SVGA or Super Video Graphics Array capable of 800×600×6 bits/pixel (16 colors) or 650×480×8 bits/pixel (256 colors). SVGA was created by the Video Electronics Association (VESA); and
  (iii) XGA (v1-4) or extended Graphics Array capable of 1024×768 pixels at 32,768 colors.

Additional standards have been added such as SXGA, defining pixel sizes above 1960×1440 and color depths of 32 bits/pixel and higher.

In the event that a larger range of colors (or palette) is used by a media signal than a particular display or browser can handle, most browsers are typically adapted to "dither" the colors, which is herein intended to mean that the browser will find colors within its palette that it can substitute for any color that is outside of its palette. To further illustrate the wide range of different system display capabilities, systems using Windows™ (commercially available from Microsoft Corporation) and Macintosh™ (commercially available from Apple Corporation) based operating systems do not have identical palettes; within the usual 256 color palette, 216 are common to both types of browsers, whereas 40 are different and therefore require dithering by a browser operating within one of the systems if an image signal is communicated to that type of system in a format specified by the other.

Many different technologies also exist with respect to how a visual display is enabled from electronic information. The terms "VDT" or "Video Display Terminals" are generally used within the computer industry and are herein intended to be used interchangeably with simple references to "display". With respect to computer terminal use, VDT's comprise a computer output surface and projecting mechanism that shows text and graphic images to the computer user. VDT's may use a variety of specific display technologies, including for example cathode ray tubes ("CRTs"), liquid crystal displays ("LCDs"), light-emitting diodes ("LEDs"), gas plasma, or other image projection technology. The display is usually considered to include the screen or projection surface and the device that produces the information on the screen. In some computers, the display is packaged in a separate unit or "monitor", or the display may be fully integrated in a single unit with the computer processor.

With respect to LCD's in particular, this technology generally requires minimal volume and physical depth compared to other VDT's, and therefore is typically used in laptop computers and cellphone/PDA's. LCD's consume much less power than LED and gas-display VDT's because they work on the principle generally of blocking light rather than emitting it. An LCD may be either "passive matrix" or "active matrix", which is also known as "thin film transistor" or "TFT" display. The passive matrix LCD has a grid of conductors with pixels located at each intersection in the grid. A current is sent across two conductors on the grid to control the light for any pixel. An active matrix has a transistor located at each pixel intersection, requiring less current to control the luminance of a pixel. For this reason, the current in an active matrix display can be switched on and off more frequently, improving the screen refresh time and therefore efficacy for higher speeds of streaming media (e.g. action video). Some passive matrix LCD's have dual scanning, in that they scan the grid twice with current in the same time as one scan in earlier versions; however, the active matrix is still generally considered to be the superior technology of the two. Reflective color display technology—the integration of color filters into passive-matrix display construction—is a low-power, low-cost alternative to active-matrix technology. Because they reflect ambient light, reflective LCDs deliver particularly high performance during use outside in daylight. Various different display technologies, and therefore transmission formats, have also been specifically developed for television viewing. Thus several different standards have evolved for television transmission, and their differences may significantly impact the nature and extent of compression desired (and therefore the choice of a particular CODEC) for communicating streaming media signals in television environs. These standards include in particular and without limitation: standard definition television ("SDTV"); and high definition television ("HDTV").

"SDTV" or "standard definition television" and "HDTV" or "high definition television" are the two categories of display formats for digital television ("DTV") transmissions, which are becoming the standard. These formats provide a picture quality similar to digital versatile disk ("DVD"), and are summarized relative to their similarities and differences as follows.

HDTV provides a higher quality display, with a vertical resolution display from about 720p to at least about 1080i and an aspect ratio (the width to height ratio of the screen) of generally 16:9, for a viewing experience similar to watching a movie. In comparison, SDTV has a range of lower resolutions and no defined aspect ratio. New television sets will be either HDTV-capable or SDTV-capable, with receivers that can convert the signal to their native display format. SDTV, in common with HDTV, using the MPEG-2 file compression method in a manner that generally reduces a digital signal from about 166 Mbps to about 3 Mbps. This allows broadcasters to transmit digital signals using existing cable, satellite, and terrestrial systems. MPEG-2 uses the lossy compression method, which means that the digital signal sent to the television is compressed and some data is lost, but this lost data may or may not affect how the human eye views the picture. Both the ATSC and DVB standards selected MPEG-2 for video compression and transport. The MPEG-2 compression standard is elsewhere herein described in further detail.

Because a compressed SDTV digital signal is smaller than a compressed HDTV signal, broadcasters can transmit up to five SDTV programs simultaneously instead of just one HDTV program, otherwise known as "multicasting". Multicasting is an attractive feature because television stations can receive additional revenue from the additional advertising these extra programs provide.

With today's analog television system, only one program at a time can be transmitted. Note that this use of the term "multicasting" is distinct from its use in streaming video where it involves using special addressing techniques.

When the United States decided to make the transition from analog television to DTV, the Federal Communications Commission decided to let broadcasters decide whether to broadcast SDTV or HDTV programs. Most have decided to broadcast SDTV programs in the daytime and to broadcast HDTV programs during prime time broadcasting. Both SDTV and HDTV are supported by the Digital Video Broadcasting (DTV) and Advanced Television Systems Committee (ATSC) set of standards.

HDTV as a television display technology provides picture quality similar to 35 mm. movies with sound quality similar to that of today's compact disc (further with respect to audio quality, HDTV receives, reproduces, and outputs Dolby Digital 5.1). Some television stations have begun transmitting HDTV broadcasts to users on a limited number of channels. HDTV generally uses digital rather than analog signal transmission. However, in Japan, the first analog HDTV program was broadcast on Jun. 3, 1989. The first image to appear was the Statue of Liberty and the New York Harbor. It required a 20 Mhz channel, which is why analog HDTV broadcasting is not feasible in most countries.

HDTV provides a higher quality display than SDTV, with a vertical resolution display from 720p to 1080i. The p stands for progressive scanning, which means that each scan includes every line for a complete picture, and the i stands for interlaced scanning which means that each scan includes alternate lines for half a picture. These rates translate into a frame rate of up to 60 frames per second, twice that of conventional television. One of HDTV's most prominent features is its wider aspect ratio (the width to height ratio of the screen) of 16:9, a development based on a research-based belief that the viewer's experience is enhanced by screens that are wider. HDTV pixel numbers range from one to two million, compared to SDTV's range of 300,000 to one million. New television sets will be either HDTV-capable or SDTV-capable, with receivers that can convert the signal to their native display format.

In the United States, the FCC has assigned broadcast channels for DTV transmissions. In SDTV formats, DTV makes it possible to use the designated channels for multiple signals at current quality levels instead of single signals at HDTV levels, which would allow more programming with the same bandwidth usage. Commercial and public broadcast stations are currently deciding exactly how they will implement their use of HDTV.

Simulcast is the simultaneous transmission of the same television program in both an analog and a digital version using two different channels or frequencies. At the end of the DTV transition period, it is believed by that analog transmission will be substantially replaced such that current analog channels will be used solely for DTV. The extra channels that were used for digital broadcasting may for example then be auctioned and used for more television channels or other services such as datacasting. Simulcast is also used for the transmission of simultaneous television and Internet services, the transmission of analog and digital radio broadcasts, and the transmission of television programs in different screen formats such as the traditional format and the wide screen format. Simulcast broadcasting is used worldwide.

The transition to DTV is not an easy or inexpensive transition. For a television station to transmit DTV programming, it must build its DTV facilities, but a station must have revenue to build these facilities. Simulcast allows stations to continue receiving revenues from traditional analog programming and also gain extra revenues from the extra digital programming. Another obstacle in the transition to DTV is lack of interest among consumers. The need for special equipment is prohibiting viewers from seeing the difference between digital and analog programs, which is also slowing down public enthusiasm for DTV.

The equipment needed for operating DTV depends on whether terrestrial, cable, or satellite services are used as the transmission channel/carrier. In any event, and according to known or anticipated systems, it is generally believed that consumers will, at a minimum, have to purchase a converter to view DTV transmissions on their old television sets. In addition, consumers that use terrestrial services or antennas to receive television signals need an antenna equipped for digital signals. A consumer located in mountainous terrain in an ATSC-compliant country may not be able to receive terrestrial-based digital signals because of multipath effects. This is common even with today's analog television system. In DVB compliant countries, terrain does not affect the reception of digital signals. Satellite users are already enjoying DTV broadcasting, but a larger satellite dish might be needed to view HDTV programming.

A "set-top" box is herein defined as a device that enables a television set to become a user interface to the Internet and also enables an analog television set to receive and decode DTV broadcasts. DTV set-top boxes are sometimes called receivers. It is estimated that 35 million homes will use digital set-top boxes by the end of 2006, the estimated year ending the transition to DTV.

A typical digital set-top box contains one or more microprocessors for running the operating system, usually Linux or Windows CE, and for parsing the MPEG transport stream. A set-top box also includes RAM, an MPEG decoder chip, and more chips for audio decoding and processing. The contents of a set-top box depend on the DTV standard used. DVB-compliant set-top boxes contain parts to decode COFDM transmissions while ATSC-compliant set-top boxes contain parts to decode VSB transmissions. More sophisticated set-top boxes contain a hard drive for storing recorded television broadcasts, for storing downloaded software, and for other applications provided by the DTV service provider. Digital set-top boxes can be used for satellite and terrestrial DTV but are used mostly for cable television. A set-top box price ranges from $100 for basic features to over $1,000 for a more sophisticated box.

In the Internet realm, a set-top box often really functions as a specialized computer that can "talk to" the Internet—that is, it contains a Web browser (which is really a Hypertext Transfer Protocol client) and the Internet's main program, TCP/IP. The service to which the set-top box is attached may be through a telephone line as, for example, with Web TV or through a cable TV company like TCI.

To take advantage of Dolby Digital 5.1 channel for satellite broadcasts, a satellite receiver that provides a Dolby Digital output is necessary. For cable users, all digital set-top boxes are equipped with a Dolby Digital two-channel decoder. To use 5.1 channel sound, a 5.1 channel-compliant set-top box is needed or an external 5.1 channel decoder unit.

The most dramatic demonstration of digital television's benefits is through a high-end HDTV, because of the larger screen, wider aspect ratio and better resolution. Like most new technologies, however, HDTV is expensive. Nevertheless, less expensive digital TVs provide a markedly improved viewing experience over regular TV, and for those who choose to retain their old sets, even the addition of a set-top converter will deliver a discernibly improved picture and sound.

The FCC's schedule for transition to DTV proposes that everyone in the U.S. should have access to DTV by 2002 and that the switch to digital transmission must be completed either by 2006 or when 85% of the households in a specific area have purchased digital television sets or set-top converters.

In the early 1990s, European broadcasters, consumer equipment manufacturers, and regulatory bodies formed the European Launching Group (ELG) which launched a "DVB" or "Digital Video Broadcasting" project in order to introduce DTV throughout Europe. DVB is intended to provide an open system as opposed to a closed system. Closed systems are content-provider specific, not expandable, and optimized only for the system they were developed for. An open system, such as DVB, allows the subscriber to choose different content providers and allows integration of PCs and televisions. DVB systems are intended to be optimized for television, but as well as supporting home shopping and banking, private network broadcasting, and interactive viewing. DVB is intended to open the possibilities of providing crystal-clear television programming to television sets in buses, cars, trains, and even hand-held televisions. DVB is also promoted as being beneficial to content providers because they can offer their services anywhere DVB is supported regardless of geographic location. They can also expand their services easily and inexpensively and ensure restricted access to subscribers reducing lost revenues due to unauthorized viewing. Today, the DVB Project consists of over 220 organizations in more than 29 countries worldwide and DVB broadcast services are available in Europe, Africa, Asia, Australia, and parts of North and South America Format-Specific Media Various different formats for the streaming media signals themselves are also herein summarized by way of non-limiting example to also provide a further understanding of how CODECS may vary for a particular case.

"DVD" is an acronym for "digital versatile disc" is generally defined as a relatively recent optical disc technology that holds up to about 4.7 Gigabytes of information on one of its two sides, or enough for a movie about 133 minutes long on average. With two layers on each of its two sides, it may hold up to 17 Gigabytes of video, audio, or other information, compared to current CD-ROM discs of approximately the same physical size that hold about 600 Mbytes (DVD holds more than about 28 times the information). DVD players are required to play DVD's, though they will also play regular CD-ROM discs. DVDs can be recorded in any of three general formats variously optimized for: (i) video (e.g. continuous movies); (ii) audio (e.g. long playing music); and (iii) or a mixture (e.g. interactive multimedia presentations). The DVD drive has a transfer rate somewhat faster than an 8-speed CD-ROM player. DVD format typically uses the MPEG-2 file and compression standard, which has about 4-times the resolution of MPEG-1 images and can be delivered at about 60 interlaced fields per second where two fields constitute one image (MPEG-1 delvers about 30 non-interlaced frames per second. MPEG-2 and -1 standards are elsewhere herein defined in more detail. Audio quality on DVD is comparable to that of current audio compact discs.

"DVD-Video" is the name typically given for the DVD format designed for full-length movies and is a box that will work with a television set. "DVD-ROM" is a name given to the player that is believed by some to be the future replacement to CD-ROM drives in computers, as these newer drives are intended to play both regular CD-ROM discs as well as DVD-ROM discs. "DVD-RAM" is the name given to writeable versions of DVDs. "DVD-Audio" is the name typically given to players designed to replace the compact disc player.

"VHS" is an acronym for "Video Home System" and is generally defined as a magnetic videotape cartridge format, typically a half-inch wide, developed for home use with the ability to record and playback analog video and audio signals. VHS has become a popular format and the de facto standard for home movie distribution and reproduction mainly due to its pervasive presence and recordability. VHS stores signals as an analog format on a magnetic tape using technology similar to that of audiocassettes. The tapes are played back and recorded on using VHS video cassette recorders (VHS VCRs). VHS tapes store up to around two hours of video typically, although some VCRs are able to record to them at a slower speed allowing up to six or even eight hours of recording per tape.

The VHS format outputs a little over 200 lines of horizontal resolution. This compares to DVDs that output over 500 lines of horizontal resolution. Technically and perceptually, VHS is a format that has been surpassed by other formats, including for example DVD, S-VHS, Hi-8 and others. However, VHS remains a pervasive means for viewing video, and VHS tapes are still easily found across the country and around the world everywhere from movie rental stores to grocery stores making then easily accessible.

"CD" is an acronym for "compact disc" and is generally defined as small, portable, round medium for electronically recording, storing, and/or playing audio, video, text, and other information in digital form. Initially, CD's were only read-only; however, newer versions allow for recording as well (e.g. "CD-RW").

"Super audio compact disc" or "SACD" is a high resolution audio CD format that, together with DVD-Audio ("DVD-A"), are the two formats competing to replace the standard audio CD (though most of the industry generally is backing DVD-A, with a general exception believed to be Philips and Sony). SACD, like DVD-A, offers 5.1 channel surround sound in addition to 2-channel stereo. Both formats improve the complexity of sound by increasing the bit rate and the sample rate, and can be played on existing CD players, although generally only at quality levels similar to those of traditional CDs. SACD uses Direct Stream Digital ("DSD") recording, which is published as being proprietary to Sony, that converts an analog waveform to a 1-bit signal for direct recording, instead of the pulse code modulation ("PCM") and filtering used by standard CDs. DSD uses lossless compression and a sampling rate of about 2.8 MHz to improve the complexity and realism of sound. SACD may also include additional information, such as text, graphics, and video clips.

Also for the purpose of further understanding, Internet-based communications also have particular protocols for communication that must be accommodated by a streaming media communications system using the Internet "superhighway". These protocols, in particular with respect to streaming media communication, are briefly summarized immediately below for the purpose of providing a more detailed understanding.

With respect to Internet communication, streaming media signals are generally communicated in digital format via data packets. The terms "packets" are herein intended to mean units of data that are routed between an origin and a destination via the Internet or any other packet-switched network. More specifically, when a file is sent, the protocol layer of the communications system (e.g. TCP layer of TCP/IP based system) divides the file into chunks of efficient size for routing. Each of these packets is separately numbered and includes the Internet address of the destination. The individual packets for a given file may travel different routs through the Internet. When they have all arrived, they are reassembled into the original file, for example by the TCP layer at the receiving end. A packet-switching scheme is an efficient way to handle transmissions on a connectionless network such as the Internet. An alternative scheme, circuit-switched, is used for networks allocated generally for voice connections. In circuit-switching, lines in the network are shared among many users as with packet-switching, but each connection generally requires the dedication of a particular path for the duration of the connection.

Wireless Communications & the WAP Gateway

Of equal importance to the contemporary age of the Internet, the age of wireless communications has significantly extended society's ability to interact outside of the fixed confines of the home and office, allowing our remote communications to break free from the umbilical cords of wires and cables. For example, in 2000, the number of mobile subscribers grew by close to 50%.

However, wireless communications systems, protocols, and enabling technologies have developed in a significantly fragmented, "format-specific" market on a world-wide scale. This is particularly true in comparing systems in wide use in the United States as compared to the rest of the world. Therefore, much effort has been expended in overcoming compatibility issues between format-specific systems and between the related wireless devices operating on different platforms. For the purpose of further understanding wireless communication as it is later related to the present invention, the following is a brief overview of significant technologies, systems, and protocols used in the wireless communication industry.

In general, the progression of wireless communications systems for cellular telephones is colloquially given the terms "1G", "2G", "2.5G", and "3G", representing respectively first generation, second generation, and so-on. Initial systems were purely analog, known as the 1G phones and systems. However, with rapid growth, available bandwidth for cellular phone use quickly eroded, giving way to digital signal processing in the 2G, which significantly widened the available bandwidth and ability for complex signal processing for advanced telecommunications. However, as demand progressed for wireless Internet access, so went the technology development from 2G phones (generally not Internet enabled), to 2.5G and 3G (progressively more enabled). As will be further developed immediately below, the systems, protocols, and enabling technologies thus have developed toward a concentrated focus in bringing the 2.5G and 3G modes to industry and consumers.

In general, there are four major digital wireless networks based upon 2G technology: time division multiple access ("TDMA"), code division multiple access ("CDMA"), Global System for Mobile communication ("GSM") and cellular digital packet data ("CDPD"). These are briefly herein described as follows.

Time division multiple access ("IDMA") is a technology used in digital cellular telephone communication that divides each cellular channel into three time slots in order to increase the amount of data that can be carried. TDMA is used by Digital-American Mobile Phone Service (D-AMPS), Global System for Mobile communication ("GSM"), and Personal Digital Cellular ("PDC"). However, each of these systems implements TDMA in a somewhat different and incompatible way. An alternative multiplexing scheme to TDMA and FDMA (frequency division multiple access) is code division multiple access ("CDMA").

Code division multiple access ("CDMA") refers to any of several protocols used in 2G and 3G wireless communications. As the term implies, CDMA is a form of multiplexing that allows numerous signals to occupy a single transmission channel, optimizing the use of available bandwidth. The technology is used in ultra-high-frequency (UHF) cellular telephone systems in the 800 MHz to 1.9 GHz bands. CDMA uses analog-to-digital conversion (ADC) in combination with spread spectrum technology. Audio input is first digitized into binary elements. The frequency of the transmitted signal is then made to vary according to a defined pattern (code), so it can be intercepted only by a receiver whose frequency response is programmed with the same code, so it follows exactly along with the transmitter frequency. There are trillions of possible frequency-sequencing codes, thus enhancing privacy and making cloning difficult. The CDMA channel is nominally 1.23 MHz wide. CDMA networks use a scheme called "soft handoff", which minimizes signal breakup as a handset passes from one cell to another. The combination of digital and spread spectrum modes supports several times as many signals per unit bandwidth as analog modes. CDMA is compatible with other cellular technologies; this allows for nationwide roaming.

The original CDMA, also known as CDMA One, was standardized in 1993 and is considered a 2G technology that is still common in cellular telephones in the U.S. One version of cdmaOne, IS-95A, is a protocol that employs a 1.25 MHz carrier and operates in RF bands at either 800 MHz or 1.9 GHz; this supports data rates of up to 14.4 Kbps. Another version, IS-95B, is capable of supporting speeds of up to 115 Kbps by bundling up to eight channels.

More recent CDMA varieties, CDMA2000 and wideband CDMA offer data speeds many times faster. CDMA2000, also known as IMT-CDMA Multi-Carrier or IS-136, is a CDMA version of the IMT-2000 standard developed by the International Telecommunications Union (ITU). The CDMA2000 standard is a 3G technology that is intended to support data communications at speeds ranging from 144Kbps to 2 Mbps. Companies that have developed versions of this standard include Ericsson and Qualcomm corporations. Wideband CDMA, or "WCDMA", is an ITU standard derived from CDMA that is also known as IMT-2000 direct spread. WCDMA is a 3G technology intended to support data rates of up to 2Mbps for local area access, or 384 Kbps for wide area access, and supports mobile/portable voice, images, data, and video communications at these speeds. WCDMA digitizes input signals and transmits the digitized output in coded, spread-spectrum mode over a 5 MHz wide carrier—a much broader range than the 200 KHz wide narrowband CDMA.

The Global System for Mobile communication ("GSM") is a digital mobile telephone system that is widely used in Europe and other parts of the world; this system uses a variation of "TDMA" (introduced immediately below) and is the most widely used of the three digital wireless telephone technologies (TDMA, GSM, and CDMA). GSM digitizes, compresses, and then sends data down a channel with two other streams of user data, each in its own time slot. It operates at either the 900 Mhz or 1800 MHz frequency band. At the time of this disclosure, GSM is generally considered the wireless telephone standard in Europe, and has been published to have over 120 million users worldwide and is available in 120 countries. At least one company in the United States, American Personal Communications (Sprint™ subsidiary), is using GSM as the technology for a broadband personal communications services ("PCS"). PCS are telecommunications services that bundle voice communications, numeric and text messaging, voice-mail and various other features into one device, service contract and bill. PCS are most often carried over digital cellular links. This service is planned to have more than 400 base stations for various compact mobile handsets that are being made by manufacturers such as Ericsson, Motorola, and Nokia corporations; these devices generally include a phone, text pager, and answering machine. GSM is part of an evolution of wireless mobile telecommunications that includes High-Speed Circuit-Switched Data (HCSD), General Packet Radio System (GPRS), Enhanced Data GSM Environment (EDGE), and Universal Mobile Telecommunications Service (UMTS).

Cellular Digital Packet Data ("CDPD") is a wireless standard providing two-way, 19.2 kbps packet data transmission over existing cellular telephone channels.

Several different protocols have also been put into use for communicating over the various wireless networks. Various specific such protocols are briefly introduced as follows.

"X.25" is a packet-based protocol, principally used at the time of this disclosure in Europe and adapted as a standard by the Consultative Committee for International telegraph and Telephone (CCITT). X.25 is a commonly used network protocol that allows computers on different public networks (e.g. CompuServe, Tymnet, or TCP/IP network) to communicate through an intermediary computer at the network layer level. X.25's protocols correspond closely to the data-link and physical-layer protocols defined in the Open Systems Interconnection ("OSI").

"OSI" is a model of network architecture and a suite of protocols (a protocol stack) to implement it, developed by ISO in 1978 as a framework for international standards in heterogeneous computer network architecture. The OSI architecture is split between seven layers, from lowest to highest: (1) physical layer; (2) data link layer; (3) network layer; (4) transport layer; (5) session layer; (6) presentation layer; and (7) application layer. Each layer uses the layer immediately below it and provides a service to the layer above. In some implementations, a layer may itself be composed of sub-layers.

General Packet Radio Services ("GPRS") is a packet-based wireless communication service that promises data rates from 56 to 114 Kbps and continuous connection to the Internet for mobile phone and computer users. The higher data rates will allow users to take part in video conferences and interact with multimedia Web sites and similar applications using mobile handheld devices as well as notebook computers. GPRS is based on Global System for Mobile ("GSM") communication and will complement existing services such as circuit-switched cellular phone connections and the Short Message Service ("SMS"). SMS is a message service offered by the GSM digital cellular telephone system. Using SMS, a short alphanumeric message (160 alphanumeric characters) can be sent to a mobile phone to be displayed there, much like in an alphanumeric pager system. The message is buffered by the GSM network until the phone becomes active.

The packet-based service of GPRS is publicized to cost users less than circuit-switched services since communication channels are being used on a shared-use, as-packets-are-needed basis rather than dedicated only to one user at a time. It is also intended to make applications available to mobile users because the faster data rate means that middleware currently needed to adapt applications to the slower speed of wireless systems will no longer be needed. As GPRS becomes widely available, mobile users of a virtual private network ("VPN") will be able to access the private network continuously rather than through a dial-up connection. GPRS is also intended to complement "Bluetooth", a standard for replacing wired connections between devices with wireless radio connections. In addition to the Internet Protocol ("IP"), GPRS supports X.25 protocol. GPRS is also believed to be an evolutionary step toward Enhanced Data GSM Environment ("EDGE") and Universal Mobile Telephone Service ("UMTS").

Universal Mobile Telecommunications Service ("UMTS") is intended to be a 3G, broadband, packet-based transmission of text, digitized voice, video, and multimedia at data rates up to 2 Mbps. UMTS is also intended to offer a consistent set of services to mobile computer and phone users no matter where they are located in the world. This service is based upon the GSM communication standard, and is endorsed by major standards bodies and manufacturers, and is the planned standard for mobile users around the world by 2002. Once UMTS is fully implemented, computer and phone users can be constantly attached to the Internet as they travel.

Enhanced digital GSM enterprise ("EDGE")service is a faster version of the Global System for Mobile (GSM) wireless service, designed to deliver data at rates up to 384 Kbps and enable the delivery of multimedia and other broadband applications to mobile phone and computer users. The EDGE standard is built on the existing GSM standard, using the same time-division multiple access (TDMA) frame structure and existing cell arrangements. EDGE is expected to be commercially available in 2001. It is regarded as an evolutionary standard on the way to Universal Mobile Telecommunications Service (UMTS).

Wireless Application Protocol ("WAP") is a specification for a set of communication protocols to standardize the way that wireless devices such as cellular telephones and radio transceivers, can be used for Internet access, including e-mail, the World Wide Web, newsgroups, and Internet Relay Chat ("IRC"). While Internet access has been possible prior to WAP, different manufactures have used "format-specific" technologies. WAP enables devices and service systems to intercooperate.

In most recent times, much effort has been expended to merge the fields of wireless communications and the Internet in order to bridge the gap of cords, wires, and cables that had before separated the "information superhighway" from reaching people on wireless devices. Such technology merger has developed for example within the home and office network setting itself, where wireless infrared and radio frequency communications systems have been developed for interfacing equipment within a "wireless" office or home. Another substantial effort has also been underway to communicate and share information with more remote wireless devices, such as cell phones and personal digital assistants ("PDA's").

PDA's are typically small, mobile devices that may be "hand-held" and usually contain limited processors and display screens for managing, storing, and displaying telephone books, calendars, calculator, and the like. Recently available PDA's have been made "wireless enabled", either by having wireless modems embedded within the PDA itself, or by coupling to wireless modem "plug-ins" such as a cell phone. Wireless enabled PDA's are also generally "Internet enabled" with limited "browser" capability allowing the PDA to communicate with server devices over the Internet. Examples of commercially available wireless "enabled" PDA's include the Palm VII (from Palm, Inc.), and the iPAQ™ (from Compaq, Inc.). These PDA's include a Windows CE™ operating system that provides the limited browser capability and screen display for content. These phones have processing capabilities from about 33 MHz to about 220 MHz and varied screen display capabilities, such as for example 320×240 pixel screen displays.

Similarly, cellular phones themselves have also been recently rendered "Internet enabled", also with limited browser capability and screens to display content. Examples of "Internet enabled" cellular phones include, for example: Sanyo SCP-4000™, Motorola i1000plus™, among a wide range of others; this wide field represents hundreds of different processing and display capabilities.

In either the case of the PDA or the cellular phone that is "Internet-enabled", compatibility with the Internet protocols of communication must be achieved. In general, wireless communications take place over a wireless applications protocol ("WAP"), whereas communications over the Internet proceed according to one of several different protocols, the most common being Transmission Control Protocol/Internet Protocol ("TCP/IP"). Therefore, a WAP Gateway, as shown in FIG. 1E, forms a bridge between the world of the Internet (or any other IP packet network) and the wireless phone/data network, which are fundamentally different in their underlying technologies. The gateway, in essence, does the interpretation between these two distinct entities, allowing the consumer to use their cell phone or hand held computing device (e.g. PDA) to access the Internet wirelessly.

However, streaming media that is formatted for transmission to higher power computing devices such as desk-top computers having significant display capabilities is not generally compatible for receipt and viewing on these devices that have severely limited processing and display functionality. Particular "format-specific" compression schemes have been developed for use specifically with only these devices, and only specific media content may be transmitted to these devices in those formats.

There is still a need for a streaming media communications system that is adapted to transmit a wide variety of streaming media signals in appropriate formats to be played by wireless devices such as cellular phones and PDA's having unique constraints, such as, for example, limited and variable processing, memory, and display capabilities.

SUMMARY OF THE INVENTION

The present invention addresses and overcomes the various limitations, inefficiencies, resource limitations, and incompatibilities of prior known methods for streaming media communication, and is provided in various beneficial modes, aspects, embodiments, and variations as follows.

The present invention according to one embodiment is a streaming media communications system that uses a computer implemented intelligence system, such as artificial intelligence, in a network system, such as a neural network, to communicate a streaming media signal between a transmission device and at least one destination device.

The present invention according to another embodiment is a system for communicating a streaming media signal between a transmission device and a plurality of destination devices each having different media signal processing capabilities.

The present invention according to another embodiment is a streaming media communications system that is adapted to communicate a streaming media signal from a single transmission device and at least one destination device over a plurality of different transmission channels, each having a different transmission capability or constraints with respect to communicating the streaming media signal.

The invention according to another embodiment is a neural network incorporating an artificial intelligence implementation that is adapted to be trained in an adaptive learning process with respect to the ability of a streaming media compression system's ability to compress a streaming media signal at a source into a compressed representation of the streaming media signal, transmit the compressed representation over a transmission channel to a destination device, and decompress the compressed representation into a decompressed representation of the streaming media signal which is adapted to be played by the destination device.

The invention according to another embodiment is a system for compressing streaming media signals according to a CODEC that is used at least in part based upon at least one parameter affecting communication of the streaming media signals. According to one aspect of this mode, the CODEC is used according to at least one of the following parameters: a previously learned behavior of the CODEC with respect to another reference signal, a previously learned behavior of the CODEC with respect to a prior attempt at compressing or decompressing the same streaming media signal, a comparison of the CODEC's operation with respect to the streaming media signal against a reference algorithm compression of the streaming media signal, a learned constraint of the transmission channel, and a learned constraint of the destination device. In one beneficial embodiment, the CODEC is used based upon more than one of these parameters, and in still a further beneficial variation is used based upon all of the parameters.

The invention according to another embodiment is a system for compressing streaming media signals using a CODEC library that is adapted to store multiple CODECS of different types and operations, and that is adapted to be searched and accessed by a network system, such as a neural network, in order to provide an appropriate CODEC from the CODEC library for use in compressing the input streaming media signal into a compressed representation for transmission to a destination device.

The invention according to another embodiment is a CODEC operating system that is adapted to interface with a CODEC Library and also with a neural network in order to use the neural network in a process, such as an artificial intelligence process, to choose an appropriate CODEC from the CODEC library and use the chosen CODEC for compressing the streaming media signal into a compressed representation of the streaming media signal for transmission to a destination device.

According to one aspect, the CODEC library is adapted to receive and store a new CODEC such that the new CODEC may be interfaced with the neural network in order to be chosen and applied to compress the streaming media signal as provided.

The invention according to another embodiment is a destination agent that is adapted to be stored by a destination device for use in decompressing a compressed representation of a streaming media signal. The destination agent is adapted to communicate with a remotely located, compressed streaming media transmission system in order receive and play streaming media signals therefrom. In a particularly beneficial aspect, the software agent is adapted to deliver information about the destination device to the compressed streaming media transmission system, and is also adapted to receive and decode certain encoded streaming media signals from the compressed streaming media transmission system.

The invention according to another embodiment is a system for communicating a streaming media signal having a destination agent that is adapted to be stored within a destination device for decompressing a compressed representation of a streaming media signal into a decompressed representation that may be played by the destination device.

According to one aspect of this embodiment, the destination agent has a diagnostic agent and also a decompression agent. The diagnostic agent is adapted to determine a value for at least one parameter of the destination device related to the capability for processing, storage, or display. The decompression agent is adapted to apply a CODEC decompressor to decompress the compressed representation of the streaming media signal into the decompressed representation using a CODEC based at least in part upon the value of the at least one parameter.

According to another aspect, the destination agent comprises a software agent. In one variation, the software agent is embedded within the destination device. In another variation, the software agent is adapted to be loaded onto the destination device at least in part by a remotely located source that is adapted to deliver the compressed representation of the streaming media signal to the destination device.

The invention according to another embodiment is a transcoder for trancoding streaming media signals between at least one initial format and at least one transcoded format. The transcoder includes a single thread for each of several streaming media signals.

The invention according to another embodiment is a video-on-demand streaming media system incorporating the embodiments shown in the Figures and otherwise described herein.

The invention according to another embodiment is a mobile telephone communications system incorporating the embodiments shown in the Figures and otherwise described herein.

The invention according to another embodiment is an interactive gaming system incorporating the embodiments shown in the Figures and otherwise described herein.

The invention according to another embodiment incorporates the various modes, embodiments, aspects, features, and variations herein disclosed above and elsewhere to static media, as well as to media that is stored locally after processing (e.g. compressing) and not transmitted.

DETAILED DESCRIPTION OF THE EMBODIMENTS

Figure 1A:
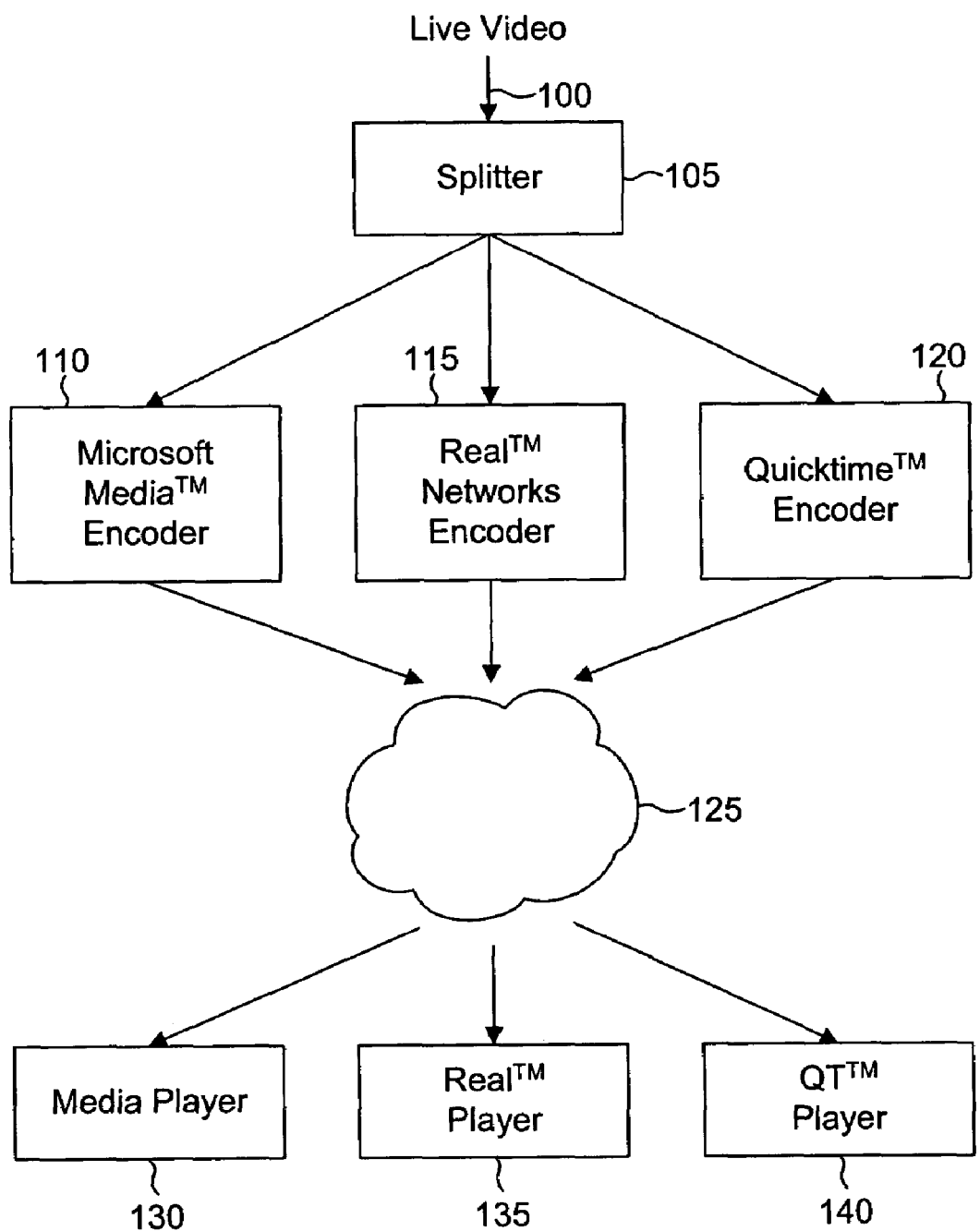
FIGS. 1A-B show schematic block diagrams representing two respective variations of prior media communications systems using conventional CODEC systems.
Figure 1B:
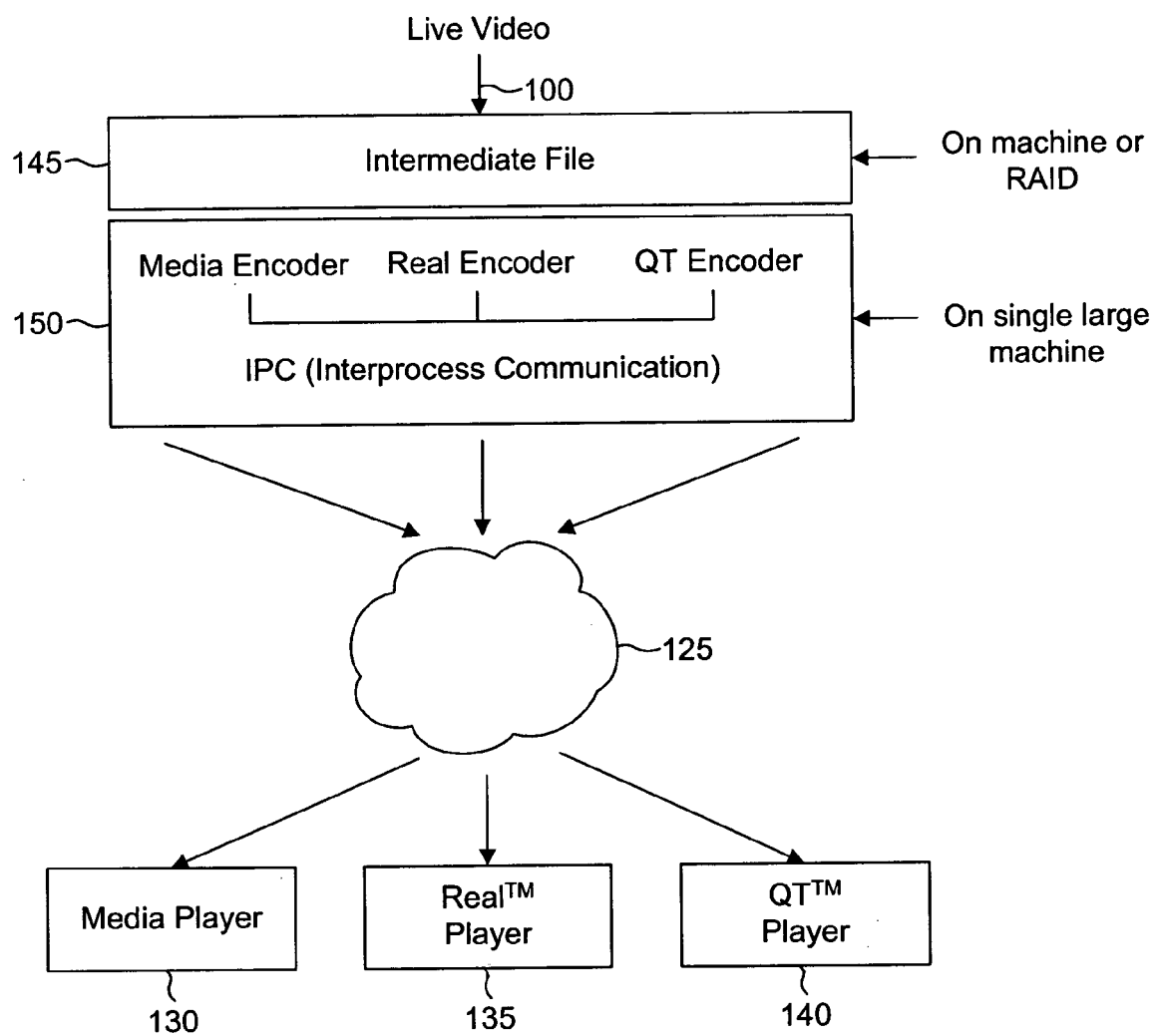
Figure 1C:
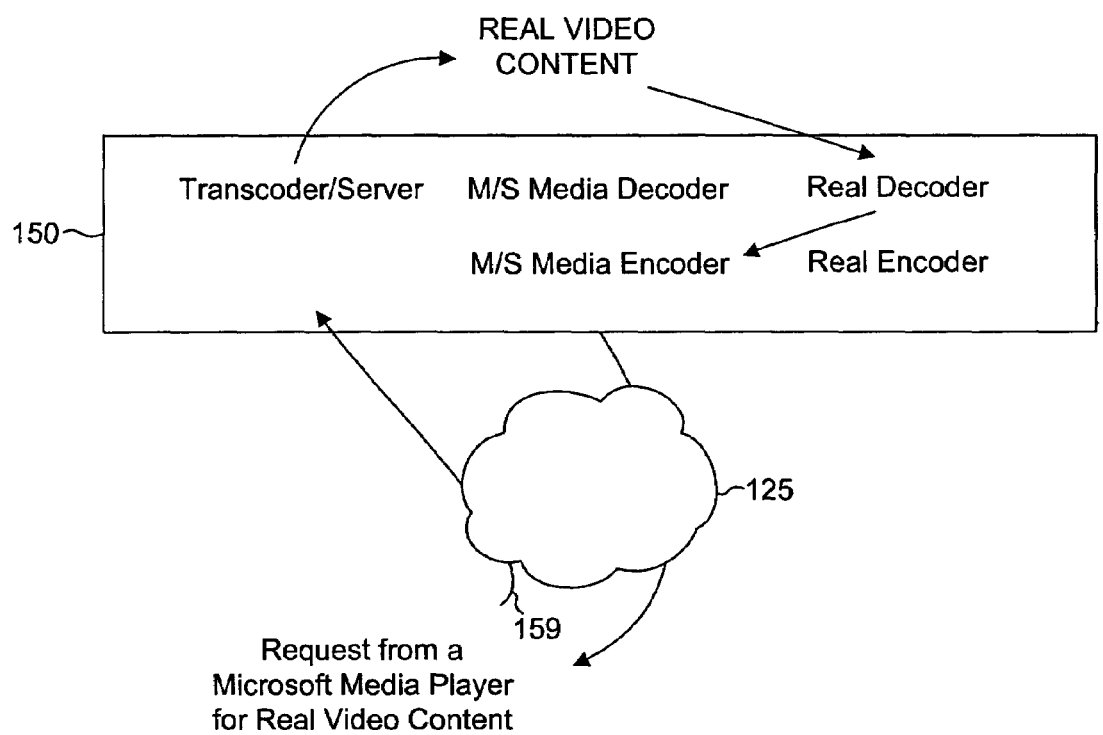
FIGS. 1C-D show schematic block diagramsrepresenting two respective variations of prior media transcoder systems.
Figure 1D:
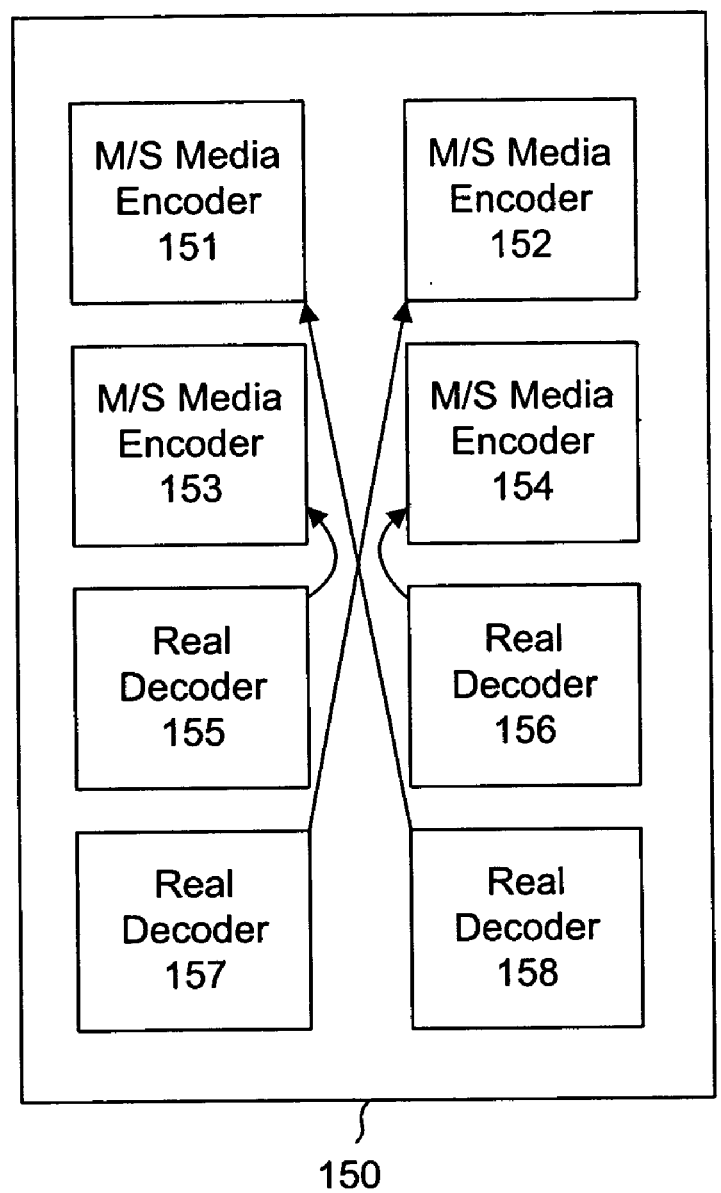
Figure 1E:
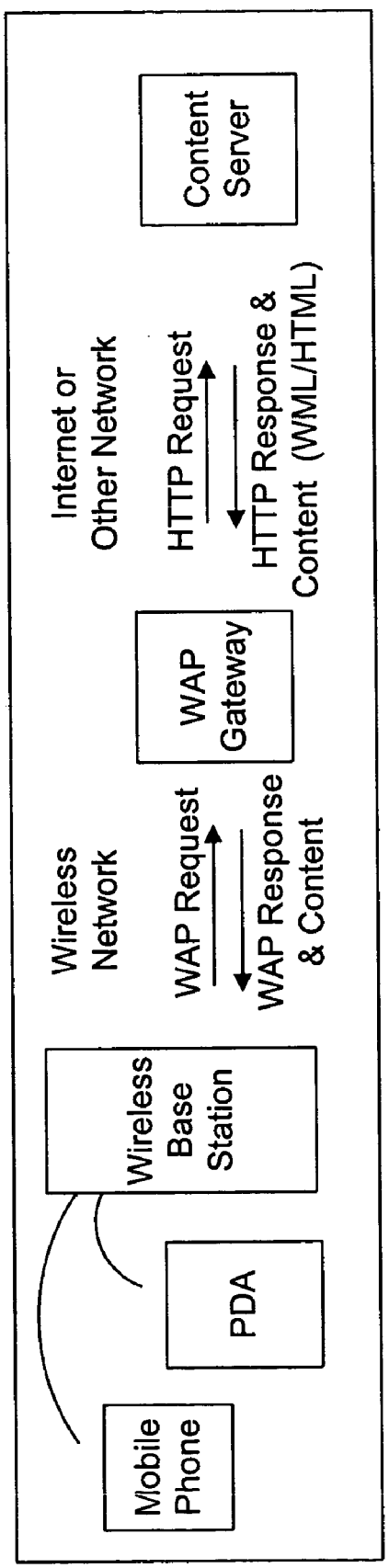
FIG. 1E shows a schematic block flow diagram of the various interrelated components in a prior WAP gateway communications system.
Figure 2:
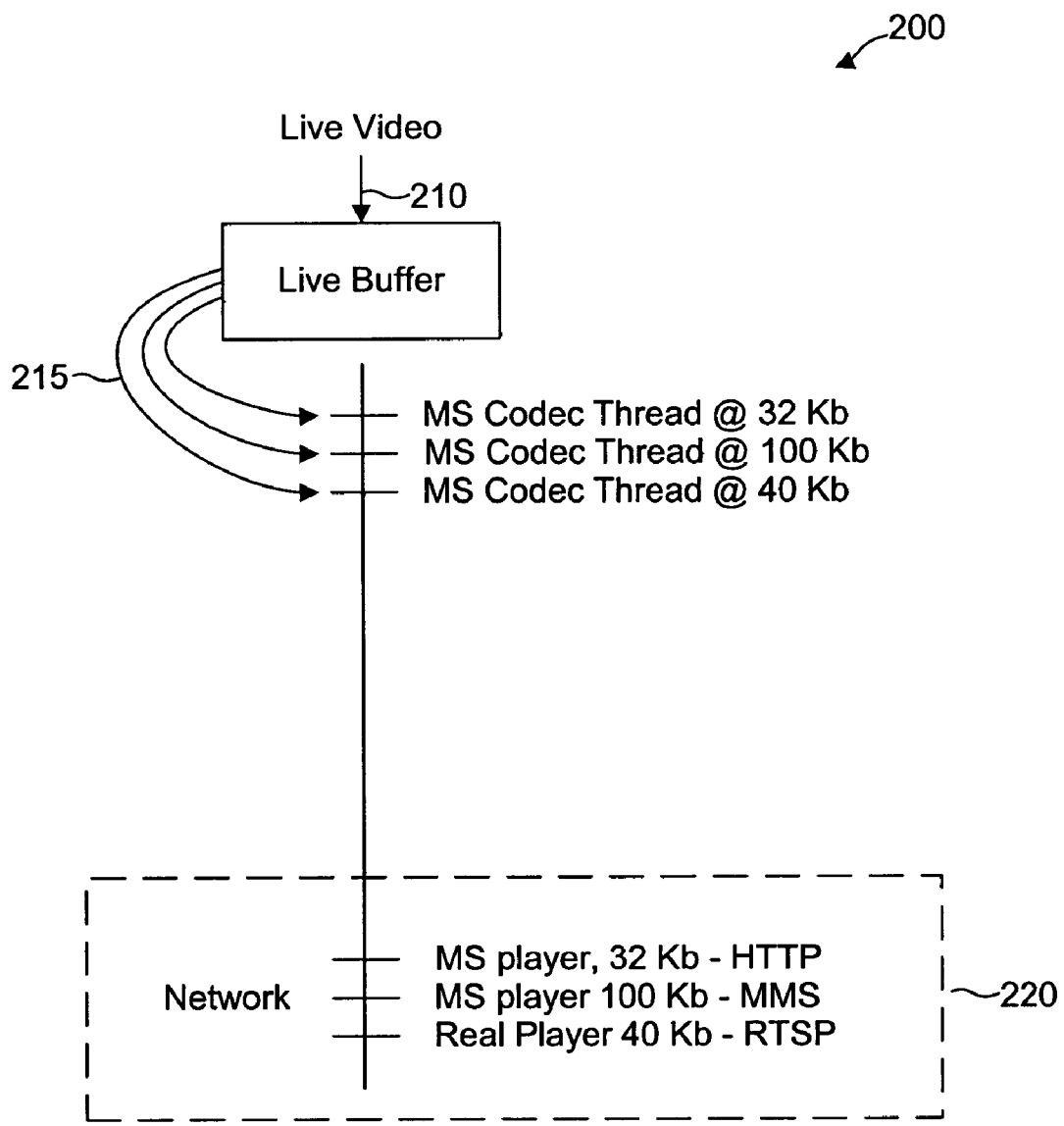
FIGS. 2-3 show schematic block diagrams of the transcoder system of one embodiment of the present invention during two respective modes of use.

The present invention as illustrated variously through the embodiments below (and by reference to the Figures) provides a media communications system that includes a compression system, a delivery system, and a decompression system, and in another aspect includes a transcoder system. In general, the combination of these individual sub-systems provides a capability to efficiently transcode media between multiple encoding formats, in addition to customize the compression, delivery, and decompression of randomly selected streaming media signals based upon a large array of system parameters as variables. These variables include for example, without limitation, parameters related to the following: the source video signal, the source transmitting device, the transmission modality, and the destination device. The compression, delivery, and decompression of a media signal is thus customized to be optimally efficient for a given, and changing, environment of use. As a result, a wide range of complex streaming media signals may be communicated with a level of efficiency and range of device compatibility that is significantly improved over other known systems.

Notwithstanding the benefits of the overall streaming media communication system herein described, each subsystem described also independently provides beneficially useful results for streaming media communication. The various subsystems themselves, and the various iterations of combinations of these sub-systems apparent to one of ordinary skill based at least in part upon this disclosure, are also contemplated within the scope of the invention. In addition, various aspects of the overall communication system, as well as of each sub-system described, are also contemplated as useful for other applications other than specifically for streaming media communication in particular. Therefore, where apparent to one of ordinary skill, such additional applications are further contemplated within the scope of the invention, despite the particularly useful modes applied to improved streaming media communication.

Transcoder

A video/audio transcoder 200 is provided according to the invention that enables one incoming video source 210 to be streamed across multiple formats 215 (for example MPEG4, Real Video™, and QuickTime™) from one device without human intervention. The transcoder 200 according to the present embodiment provides substantially greater functionality at a fraction of the price of other commercially available transcoder systems. Moreover, because the system works "on-the-fly," pre-compressing of the video source 210 is significantly diminished.

More specifically, the transcoder 200 system and method according to the invention is adapted to transcode digitized media originating from any compressed or uncompressed format to be reproduced into any other compressed format—on demand, real-time. The system 200 and method also enables efficient, simultaneous processing of multiple streams 215 of differing data from a multiplicity of different compressed or uncompressed formats into a multiplicity of different compressed formats.

Figure 3:
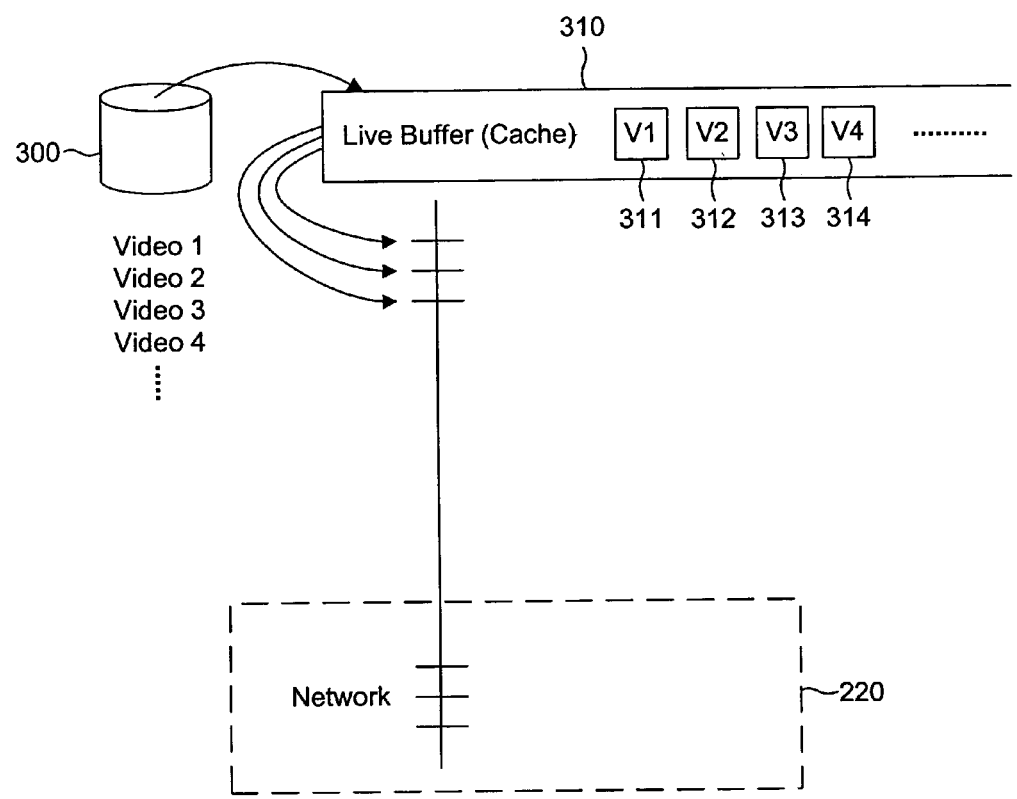

The transcoder 200 of the present embodiment is herein described in an overall system by way of illustration by reference to FIG. 3. As shown, a first player initially makes a connection to a server 300 that houses the transcoder 200. The player format (e.g., Microsoft Media), connection speed (e.g., 32 Kbps) and protocol (HTTP) are identified. The server 300 pulls the live or pre-encoded video into a "live buffer" or "cache" 310 and encodes it as digitized but nearly uncompressed data (e.g., AVI or MPEG2). The server 300 then loads an appropriate CODEC thread (e.g. Microsoft Media™) at the connection speed (e.g. 32 Kbps). Next, the server 300 loads a HTTP/MS player thread that serves the first client Then, a second stream is requested by a client using M/S Player at 100 Kbps with MMS. The server loads the appropriate MS CODEC thread at the appropriate 100 Kbps rate. Then, the server 300 loads an MMS/MS player thread to serve the second client. Then, a third stream is requested by a client using Real Player at 40 Kbps with RTSP. The server 300 loads the appropriate Real CODEC thread at the appropriate 40 Kbps rate. Then, the server 300 loads an RTSP/Real player thread to serve the third client. Again, this illustration is exemplary, and other specific CODECS may be suitable substitutes, as well as other bit-rates, etc.

In order to provide still a further understanding of the present transcoder embodiment, FIG. 3 shows the transcoder 200 by way of further example as applied to serve multiple different video streams to different clients.

In brief, the present transcoder 200 shown and described uses "thread" communications instead of "IPC" or "Inter Processo Communications" that are used according to many conventional transcoding techniques. For the purpose of this transcoder 200 description, the term "thread" is herein intended to mean an encapsulation of the flow of control in a program. Single-threaded programs are those that only execute one path through their code "at a time". Multi-threaded programs may have several threads running through different code paths "simultaneously". In a typical process in which multiple threads exist, zero or more threads may actually be running at any one time. This depends on the number of CPUs the computer on which the process is running, and also on how the threads system is implemented. While a machine or system with a number of n CPUs may be adapted to run no more than n threads in parallel, the threading operation according to the present transcoder invention may give the appearance of running many more than n "simultaneously" by sharing the CPUs among threads.

The transcoder 200 provides abstract APIs, and therefore the CODEC is accessed without the (much larger) native encoder overhead. Buffering 310 is created as a function of client pull for different video streams. Moreover, the transcoder 200 of the invention utilizes a network architecture—a single thread for each different connection, combining clients into same thread if they are at they are within the buffered segment of the same content. The transcoder's 200 use of threads in the manner herein shown and described is considered highly beneficial because a context switch between two threads in a single process is believed to be considerably cheaper (processing/memory/IO) than using a context switch between two processes. In addition, the fact that all data except for stack and registers are shared between threads makes them a natural vehicle for implementing tasks that can be broken down into subtasks that can be run cooperatively.

While various specific architectures may be built around the transcoder 200 embodiments just described in order to achieve particularly desired results on a case-by-case basis. However, for the purpose of further illustration, the following is an example of a more detailed system using the transcoder 200 described. The transcoder 200 is provided adapted to support a large number of simultaneous customer streams, each with differing formats. In particular, such system may support more than 5000 simultaneous streams, and in some circumstances more than 7000 simultaneous customer streams, each with differing video formats. Still further, the transcoder 200 may be implemented to convert any of a wide number of video sources to a format uniquely appropriate or required for many different individual clients each having differing needs. In one particular example, a transcoder 200 as herein described may be implemented to support such high demand simultaneously on any of the following formats: MPEG 1; MPEG 2; MPEG 4; Motion JPEG; AVI; H.261; H.263; H.263+; RealVideo™ G-8; QuickTime™; Shockwave Flash™; Indeo Cinepak™; ASF.

It is further contemplated that the transcoder 200 may be adapted in an overall communication system to be compliant with all existing and soon anticipated fixed and mobile terminals and devices. Moreover, the transcoder 200 may be implemented to adapt output stream format variables to dynamically accommodate the channel and platform conditions of each client. Still further, the system incorporating the transcoder is adapted to support load balancing servers and routers for multi-transcoder installations. Accordingly, it is believed that the transcoder 200 of the present invention delivers significantly greater functionality for significantly lower cost than other prior transcoding techniques and systems.

As described above, various different system architectures may incorporate the transcoder 200 of the invention without departing from the scope of the invention. However, more details of a particular architecture that is believed to suitably provide the beneficial level of support just described includes the following aspects: (i) dual P3-933 processor; (ii) any variant of Unix OS; (iii) 512 MB RAM; Redundant Firewire or Gigabit Ethernet; Redundant Power Supplies. Such system may be provided in a rack mounted configuration, or otherwise to suit a particular need.

The following aspects of the transcoder 200 of the invention should be contemplated as broadly beneficial, both independently and in various combinations as is apparent to one of ordinary skill based at least in part from this disclosure.

A system and method is provided for utilizing asynchronous software thread communication in both user and kernel space to perform efficient transcoding on multiprocessor and/or distributed computing platforms (such as clustering). It has been observed that this method is more efficient than utilizing traditional IPC methods to implement the transcoder. A shared library of CODEC algorithms is created and used to access the various CODEC algorithms, thereby incurring a lower processing overhead as well as lower memory utilization than that required by the traditional combined encoder functionality such as that used in the majority of commercial encoders. Of particular benefit, common threads may be used for multiple connections, and in fact even a single thread may be used for every individual connection using the present transcoder.

A system and method is also provided for combining multiple clients to be served by the same thread (for efficiency) whenever the same content is demanded and dynamic buffers (caches) can accommodate all of the data points demanded.

Media Compression and Delivery System

A data compression and delivery system 400 and method is also provided according to the invention for real time dynamic data signal processing for optimal reproduction of approximations of original media data over a given set of constraints. This system 400 and method is illustrated schematically by way of block flow diagrams in FIGS. 4A and 5. Further description of the various beneficial features and operation of this system is provided as follows by way of exemplary embodiments generally incorporating by reference the description provided by these FIGS. 4A-5.

Figure 4A:
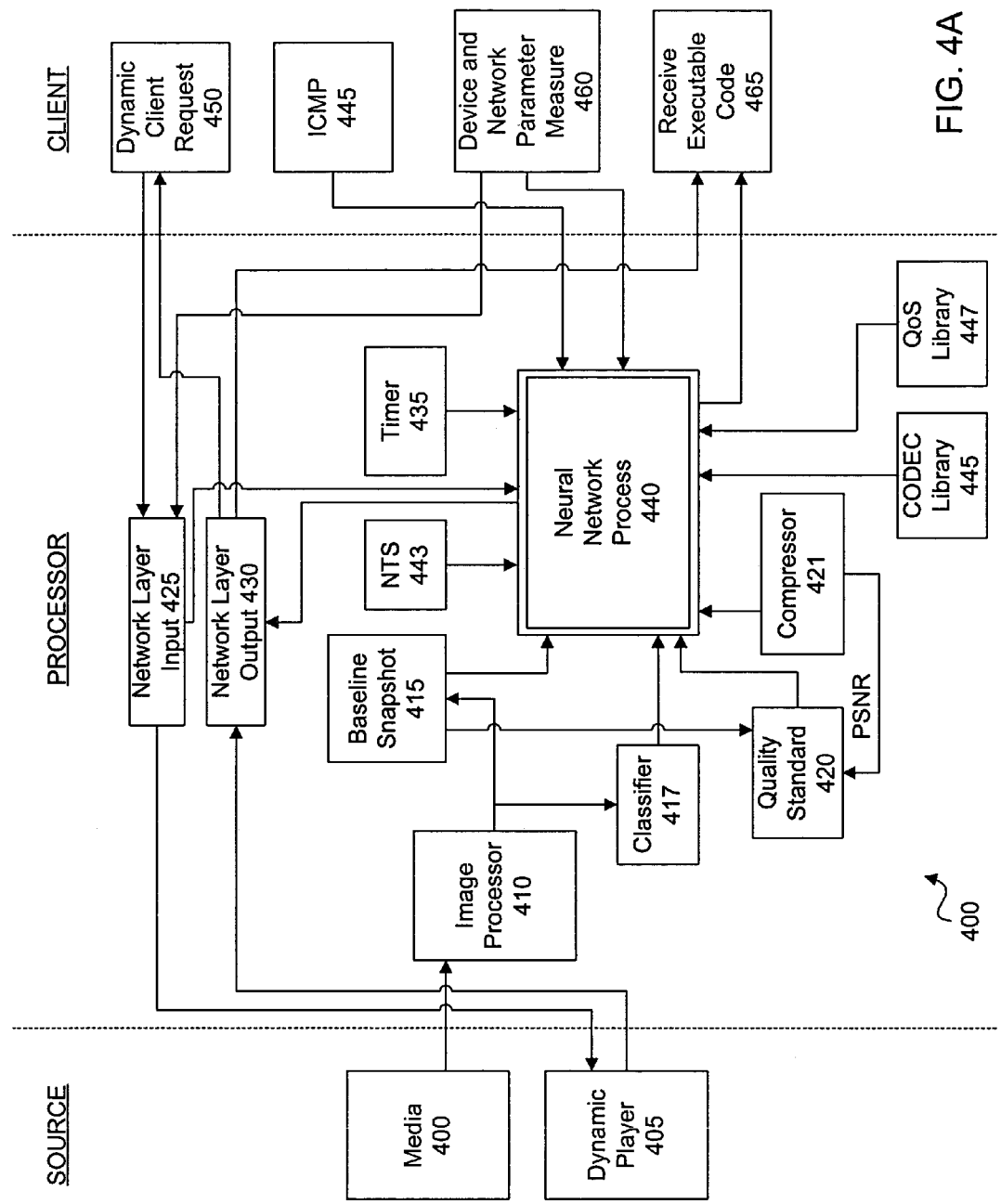
FIGS. 4A-5 show block flow diagrams in various detail, respectively, of a media communications system according one embodiment of the invention.
Figure 5:
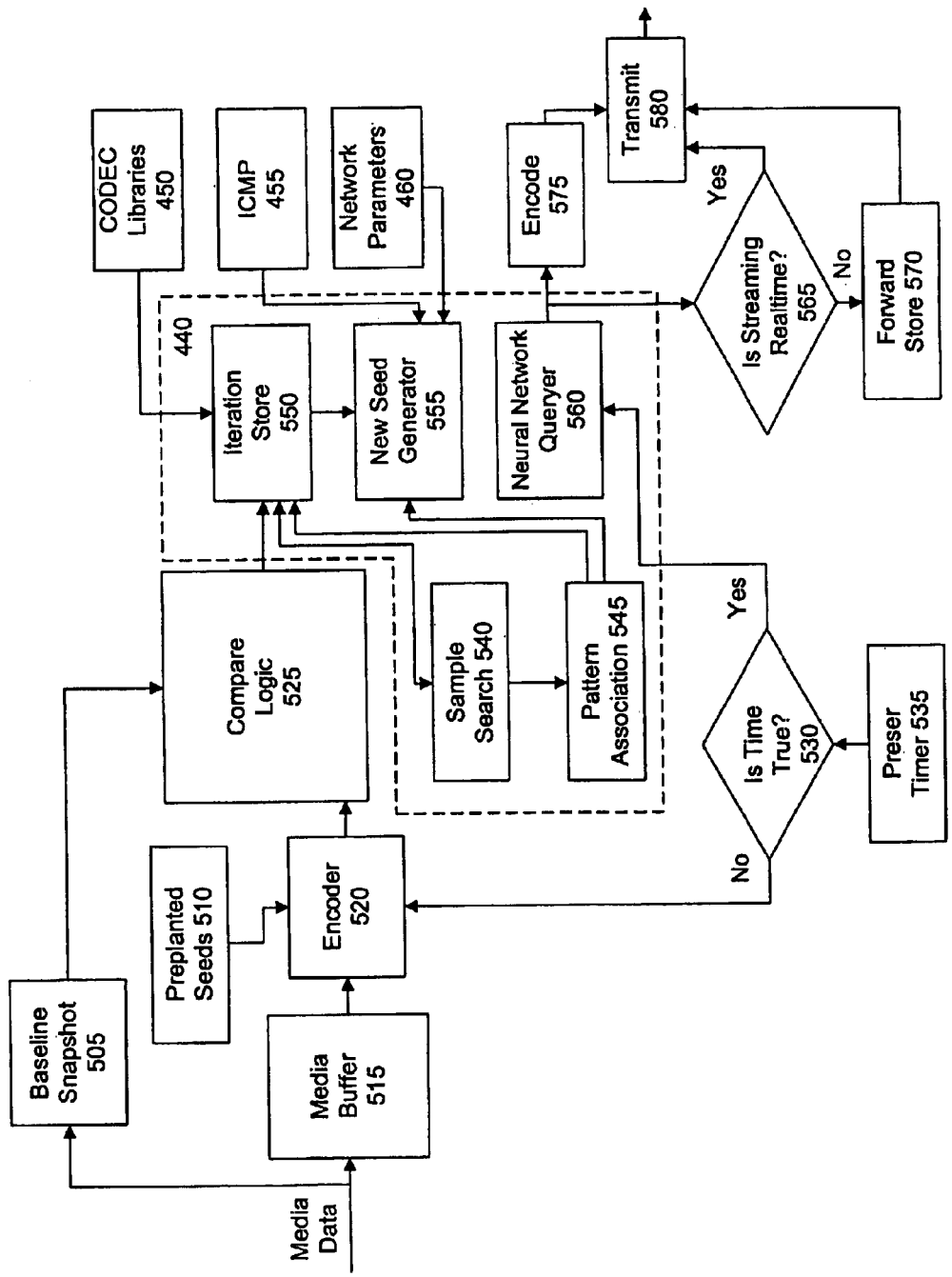

FIG. 4A is a block diagram illustration of one embodiment of the data compression and delivery system 400 of the present invention. As shown in FIG. 4A, the data compression and delivery system 400 comprises media module 405, dynamic player module 407, image processor 410, baseline snapshot module 415, classifier 417, quality of standard (QoS) module 420, network layer input module 425 and network output layer module 430. The system 400 further comprises a neural network processing module 440, timer 435, CODEC library module 445, dynamic client request module 450, ICMP module 455, device and network parameters measurement module 460 and delivery and transmit module 465.

In one embodiment, the system 400, resident at a server node(s), processes incoming uncompressed or previously compressed data. The system 400 employs neural networks 440 with artificial intelligence to monitor the incoming data to determine a plurality of key characteristics of each data segment. The system 400 correlates the incoming data characteristics with libraries 445 of pre-developed self-referencing experientially learned rules of the patterns in a scene in a sequence of frames in the input signal (e.g., a video signal) and with externally imposed constraints to optimally choose a preferred commercially available compression/decompression algorithm (e.g. CODEC) for each segment of the data. The system 400 then sets up an extensive array of usage controls, parameters and variables to optimize the chosen algorithm. Choice of algorithm and set up of parameters and variables will dynamically vary with each segment of incoming data depending upon the characteristics of the data as well as the evolving optimization process itself. The set of possible algorithms is numerous, limited only by availability and other commercial considerations. Each segment of data is encoded and compressed in the above manner and then served to a communications channel.

The compression system 400 just described is particularly useful as a streaming media compression engine, which, based upon information from the available CODEC's and the streaming media delivery system, performs frame-by-frame analysis of the incoming video using another artificially intelligent neural network 440. The system 400 then chooses the most appropriate compression format and configures the compression parameters for optimal video compression based on the best quality as measured by, in one embodiment, a selection of a peak signal to noise ratio from the underlying system environment. The result is the "optimal" video and audio service for the device and conditions present.

A more specific account of the artificial intelligence/neural network 440 aspect of this system as applied to streaming media signals is provided as follows. Initially, a library of separate and distinct CODECs are added to the system as a searchable CODEC library 445. Additional libraries of relevant reference information are also provided, including: a Network Transport Standards (NTS) library 443; and a Quality-of-Service (QoS) library 447. Then, a video (media source) is introduced either in a digitized or non-digitized format (AD conversion is used) via image processor 410. Image processor 410 then decompresses the source (if required) and employs various standard image processing algorithms used for "cleaning-up" the source image(s). The resultant source media is then passed to the baseline snapshot 415 repository where it will be used as a "perfect gold standard" for later comparison. Simultaneously, this resultant source media is also fed to the classifier 417.

The classifier 417 analyzes the source media for temporal, spatial and logical features for the purpose of creating source media sub-segments which exhibit similar combinations of temporal, spatial and logical features. "Similar" is defined to mean a contiguous sub-segment of the source media that contains common temporal, spatial and logical features that would lend themselves to a particular encoding/compression algorithm (as found in the CODEC library 445). This source media sub-segment (or, in one embodiment, a group of contiguous video and audio frames) is referred to as a "scene".

The neural network process 440 then operates upon this scene by employing CODECs from the CODEC library 445 to compress the scene. The internal configuration of each CODEC are manipulated/changed in accordance with inputs obtained from the NTS library 443, QoS library 447, Timer Process 435, Network layer Input 425, ICMP agent 455 and the Device and Network Parameter measurement agent 460. The compressed scene is then decompressed and a comparison is made against the Baseline Snapshot 415 using a quality measurement made by the quality standard process 420. In one embodiment of the present invention, the Quality Standard Process 420 employs a peak signal to noise ratio (PSNR) algorithm in order to perform the comparison of the decompressed scene against the baseline snapshot of the source media. The comparison process is repeated with various CODECs from the CODEC library 445 until the Neural Network Process 440 is satisfied with the quality of the resultant compressed scene, within the constraints of the inputs received from the NTS library 443, QoS library 447, Timer process 435, Network Layer Input 425, ICMP Agent 455 and the Device and Network Parameter Measurement Agent 460. Finally, the resultant compressed scene is sent to the Network Layer Output 430 which transports the compressed scene to the Client using an appropriate Network Transport protocol and QoS algorithm.

The above process is repeated until the entire source media has been transmitted to the Client or until the process is aborted due to various possible conditions which may include: a Client request to abort, network transport failure, Client hardware failure, etc.

The NTS library 443 is a repository of network transport services that are selected and used by the Network layer output 430 to transport compressed source media to the Client and by the Network Layer Input 425 to receive information from the Client. The selection is based upon qualitative and quantitative inputs received from the Network Layer Input 425, ICMP agent 445 and the Device and Network Parameter Measurement agent 460.

The QoS library 447 is a repository of quality of service algorithms that are selected and used by the network layer output 430 to transport compressed source media to the Client. The selection is based upon qualitative and quantitative inputs received from the Network Layer Input 425, ICMP agent 455 and the Device and Network Parameter Measurement agent 460.

The ICMP agent 455 generates inputs to the neural network process 440 that dynamically provides it with the quantitative and qualitative characteristics of the transport in use between the processor and the client. In one embodiment of the present invention, the ICMP protocol is used for this purpose.

The Device and Network Parameters Measurement agent 460 generates inputs to the neural network process 440 that dynamically provides it with the qualitative and quantitative characteristics of the client's environment. In one embodiment of the present invention, these client environment characteristics include central processing unit (CPU) capacity, network interface characteristics, storage capacity and media rendering devices capabilities.

Still referring to FIG. 4A, the Network Layer Input 425 provides inbound (originating from the client) network transport services. The Network Layer Output 430 provides outbound (originating from the processor) network transport services. The Timer Process 435 provides a way for the user of the invention to limit the maximum amount of time that the Neural Network Process 440 will spend in processing a given source media.

Figure 4B:
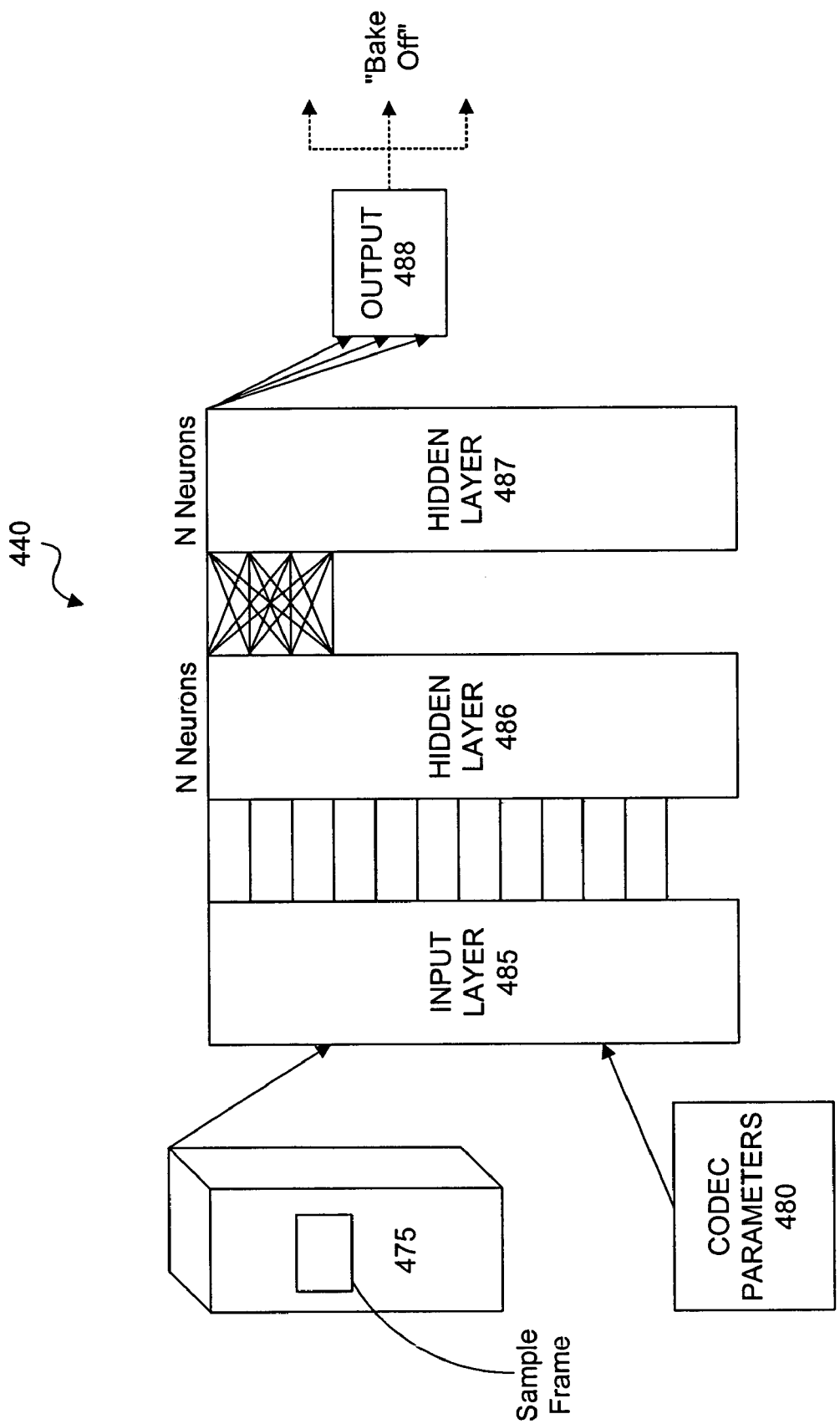

FIG. 4B is a block diagram illustration of one embodiment of a CODEC selection scheme of the neural network processing module 440 of one embodiment of the present invention. The neural network processing module 440 shown in FIG. 4B comprises a video frame selection module 475, CODEC parameters module 480, input layer module 485, hidden layers 486-487 and output module 488. In one embodiment of the present invention, a CODEC representative signal suitable to be used as a reference baseline signal for incoming signals to the neural network processing module 440 is generated by the neural network processing module 440. In one embodiment, the classifier 417 determines which scenes in segments of an incoming video signal represents the best scene in light of the available parameters of the underlying CODEC. A list of standards are used by the neural network processing module 440 to determine which scene in the signal represents the best scene. In one embodiment, the Neural Network Process 440 samples a number of pixels in a particular frame of video to determine changes in the number of pixels in that particular frame vis-a-vis the pre-determined parameters of the video signal. In another embodiment, significant motion changes in a particular scene in the video signal may be used as the baseline reference scene ("best scene") for subsequent incoming video.

In one embodiment of the present invention, the neural network processing module 440 takes a segment of video from the classifier 417 as an input and subsequently takes a sample of this input to derive enough information that characterizes the video signal. For example, in the scheme illustrated in FIG. 4B, the Neural Network Process 440 takes a window snap-shot (e.g., a 176×144 pixel window) to examine. It is advantageous for the Neural Network Process 440 to look at the center of the sample window to generate enough information about the video signal. In one embodiment of the present invention, the Neural Network Process 440 uses a minimum of 8 frames to generate the requisite information about the video signal. Information from the sample window is presented with the particular CODEC parameters from parameter module 480 to the input layer 485.

The input layer 485 is coupled to a plurality of hidden layers 486-487 via a plurality of neurons with each connection forming either a strong or weak synoptic link from one neuron to the other. In one embodiment, each CODEC supported by the neural network processing module 440 is provided with its own neural network to process the CODEC specific parameters that come with the particular CODEC. The Neural Network Process 440 generates the "best" video signal through a round-robin like process referred to as a "bake-off" from the plurality of CODECs processed during a video sampling capture period. In processing the best video representation from incoming signals, each of the corresponding neural networks for each of the CODECS generates the best representative sample from the hidden layers 486-487 and feed the signal to the output module 488. In one embodiment of the present invention, the output data set of the best CODEC from each class of CODECS being processed by the Neural Network Process 440 has two possibilities. The first being the Neural Network Process 440 submitting the best results for each CODEC to the output module 488 to a "bake-off" neural network of the plurality of "best" samples for each of the plurality of CODECS which in turn generates the winning best CODEC from the plurality of best CODECS. The bake-off neural network is smaller and faster than the neural networks that handle the processing of the CODECS.

In a second processing scheme, the Neural Network Process 440 may implement a genetic algorithm processing of the best CODECS generated by the plurality of CODECS. The genetic algorithm follows the same statistical selection approach of a marble game. Thus, instead of feeding the winning output CODEC from the various neural networks into a "bake-off" neural network, a genetic algorithm processing may be applied to feed the output module 488 from the various neural networks into a bucket and picking the best CODEC representation from a collection of scenes at the end of the source media, for example, a movie, etc. In one embodiment of the present invention, the Neural Network Process 440 uses a combination of forward and backward propagating algorithm to process the CODECS.

Referring back to FIG. 4A, for the purpose of providing a further understanding of this artificial intelligence process, the following example of one particular application is provided. It is to be appreciated that the features and operation of the system provided by this exemplary application are to be considered as broadly descriptive of the neural network 440 aspect for data compression and delivery according to the invention. Other applications may be made and fall within the scope of the invention.

A video content provider installs the system of the present invention on its server. Sample videos are introduced to the system in order to perform an initial AI process as described above. A complex matrix of CODEC characterizations, e.g. for each bit rate, pattern of video, etc., is created to be drawn from later. Next, a client end-user connects to the content provider system in order to view a video M. The communication system of the invention residing on the server delivers a software agent to the client's device, thus enabling the client to connect to the communication system in order to deliver device-specific information and receive the appropriate compressed signal with decompression CODEC for playing. Next, the AI system begins loading the video M as a streaming signal into a buffer for the purpose of choosing the appropriate CODEC for each frame and compressing each frame appropriately for transmission. The time period of the buffer depends upon multiple variables, principally the processing power of the system, and may be generally for example approximately 15 seconds for systems having appropriate capability for pre-recorded but uncompressed video media. Within the buffer, each frame is compared against each CODEC according to the "types" of sequences pre-tested in matrix as depicted in the diagram.

Next, the system 400 looks at end-user parameters, e.g. screen resolution, memory available, via information received from the software agent in the client's device. The most appropriate CODEC is then chosen and configured/tuned for optimal performance by setting certain variables within the CODEC to fixed quantities (e.g. based on comparing source video vs. patterns in past, transmission channel capabilities or constraints, and destination device capabilities or constraints). The process just described is generally done frame-by-frame by the classifier 417, but the CODECS are compared for temporal compression efficiency such that the process for each frame contemplates other leading and lagging frames. Once the appropriate CODEC is chosen and tuned for each frame (or block of frames where appropriately determined automatically by the system), the delivery system reports to the client agent and delivers the tuned CODEC ahead of the corresponding frame(s) to be decompressed and played.

It is to be appreciated that the neural network 440 of this system 400 continuously learns and remembers the performance and operation of the CODECS within the CODEC library 445, and continuously uses its learning to improve the compression efficiency of the input media signal. The process of running a signal frame through the library, modifying CODEC operating parameters, comparing compression performance by the compare logic 525 (FIG. 5) against reference standard compression, and running the loop again with further modifications, is an iterative 550 (FIG. 5) one that generally continues to improve compression efficiency. In fact, compression with one or more CODECS in the library 445 may reach improved levels better than the reference compression algorithm(s).

Nevertheless, when time constraints 435 (FIG. 4A) are present (such as in real-time push or pull demand for the streaming media content), this process must eventually be stopped at some point so that a particular frame or series of frames being processed may be compressed 575 and delivered 580 to the destination without unacceptable delay by timer 435. Then, the next frame or series may be operated upon by the neural network 440 within the CODEC operating system. These endpoints may be defined by reaching a predetermined desired result, such as for example but without limitation: (i) reaching a predetermined percentage (%) compression efficiency, such as for example as compared to the reference standard; or (ii) reaching a predetermined or imposed time limit set on the process, such as for example according to a time related to the buffer time (e.g. 15 seconds); or (iii) the earlier occurrence of either (i) or (ii). In any event, though an endpoint is reached for choosing the appropriate CODEC and performing the compression 575 and delivery 580 operations, this does not mark an endpoint for the neural network 440 training which continues. The information that is gathered through each loop in the process is stored 550. When subsequent similar frames or system constraint parameters in an incoming frame are encountered 545 in the future, the stored information is remembered and retrieved by the neural network 440 for improving compression 575 and delivery 580 efficiency.

While many different communication protocols are contemplated, one particular embodiment which is believed to be beneficial uses a "full duplex network stack" protocol, which allows for bi-directional communication between the server and the client device. Again, while other protocols may be appropriate for a particular application, the full duplex system is preferred.

The system 400 just described addresses the difficulties encountered with previously known CODEC systems by utilizing the streaming media delivery architecture to overcome latency issues and the embedded neural network 440 to overcome speed concerns. The system 400 is then able to reconfigure the algorithms used for compression in the neural network 440, the goal being to achieve optimum results every time over any network configuration.

A wide variety of CODECS may be used within the CODEC library 445 according to the overall compression systems and methods just described, though beneficial use of any particular CODEC according to the invention contemplates such CODEC taken either alone or in combination with other CODECS. For example, an appropriate CODEC library 445 may include one or more of the following types of CODECS: (i) block CODECS (e.g. MPEG versions, such as Microsoft Media™ or QuickTime™); (ii) fractal CODECS; and (iii) wavelet CODECS (e.g. Real™). According to another aspect, an appropriate CODEC library 445 may include one or more of the following types of CODECS: (i) motion predictive CODECS; and (ii) still CODECS. Still further, the CODEC library 445 may contain one or more of the following: (i) lossy CODECS; and (ii) lossless CODECS.

In one embodiment of the present invention, all of these different types of CODECS may be represented by the CODEC library 445 according to the invention; and, more than one particular CODEC of a given type may be included in the library. Or, various combinations of these various types may be provided in order to achieve the desired ability to optimize compression of a streaming media communication over a wide range of real-time variables in the signal itself, transmission channel constraints, or destination device constraints. Still further, an additional highly beneficial aspect of the invention allows for new CODECS to be loaded into the library 445 and immediately available for use in the neural network 440 compression/delivery system 400. Nevertheless, one particular example of a CODEC library 445 which is believed to be beneficial for use in optimally communicating a wide range of anticipated streaming media signals, and of particular benefit for image signals, includes the following specific CODECS: MPEG versions 1, 2, and 4 (e.g. Microsoft Media™ and QuickTime™); DUCK TruMotion™; ON2; Real Media™; MJPEG: H.261; H.263; H.263+; GIF; JPEG; JPEG2000; BMP; WBMP; DIVX.

The following are further examples of various aspects of the compression system and method just described that should be considered as broadly beneficial, both independently and in various combinations as is apparent to one of ordinary skill based at least in part on this disclosure. Further examples of such broad aspects are elsewhere provided in the "Summary of the Invention" as well as in the appended claims.

Use of neural networks 440 with artificial intelligence to achieve the various CODEC operations described is broadly and uniquely beneficial. In particular, a system and method is provided for pre-processing 410 of source data determined by application of learned responses to the signal quality, data content and format of the data. A system and method is provided for processing each unit (e.g. frame or block of frames) of source data by selection and application of a suitable CODEC (from a set of all available CODECS in the CODEC library 445) dependent upon observed characteristics of the source data and application of past-learned responses to compressing similar data. A system and method is provided for processing each unit of source data by setting a multiplicity of compression characteristics within a chosen compression algorithm to optimize capture and preservation of the original data integrity. Still further, each or all of the aforementioned signal processing steps is applied to each unique, sequential unit of signal data, e.g., signal clip, video frame, or individual packet as appropriate.

It is further contemplated that a CODEC management system 400 according to the invention provides a system and method for image processing that is adapted to normalize original source data/images as well as to resize and resample original data to fit the specification of the neural network processing module 440. An ability to serve any transmission or recording channel with a single system and with any source data stream is also provided. Moreover, the various systems and methods herein described, individually and beneficially in combination, are provided with compatibility to any connection or connectionless protocol, including but not limited to TCP, UDP, WTP/WDP, HTTP, etc.

The invention as herein shown and described also allows for highly beneficial applications for accelerating the learning rate of neural networks 440 while minimizing the data storage requirements to implement said networks. Different classes of data streams each have unique characteristics that require substantially greater processing by neural networks 440. For example, video data streams differ by prevalence and degree of motion, color contrast, and pattern and visibility of details. Greater processing requires longer times to reach optimal functionality. Greater processing also requires more predictive library storage, often growing to unlimitedly large sizes. For real-time neural network processing, processing time and storage can be minimized to greatly increase functionality by providing pre-developed predictive libraries characteristic of the class of data stream.

Accordingly, the following are examples of aspects of the pre-trained neural network 440 aspects of the invention that should be appreciated as broadly beneficial, both independently and in combination (including in combination with other embodiments elsewhere herein shown and described). A system and method is provided that creates and uses artificial intelligence in a neural network 440 and pre-trains that intelligent network for use in solving a problem, which problem may be for example but not necessarily limited to streaming media compression according to a particular beneficial aspect of the invention. A system and method is also provided for subdividing the universe of problems to be solved into useful classes that may be processed according to a learned history by the intelligent network.

An intelligent streaming media delivery system and method is also provided according to the invention that manages content transmission based on end-user capabilities and transmission channel constraints, such as for example, but without limitation, available transmission speeds or bandwidth, and Internet congestion. The data compression and delivery system 400 utilizes a computer implemented intelligence process, such as an artificial intelligence process based on a neural network to analyze aspects of the connection (including without limitation differing bit rates, latencies, transmission characteristics and device limitations) to make modifications in the compression methodology and to manage Quality of Service ("QoS") 420 issues. Compressed, digital, restorable and/or decompressible data streams may be therefore delivered to a multiplicity of different local and/or remote devices via a multiplicity of transmission mediums characterized by differing capabilities. In addition, a decompression system is provided for reproducing the decompressed data at the terminal device.

In one beneficial embodiment, a terminal device establishes a link with the system resident on a server node(s). Except for software normally required to establish communications, the terminal device might not initially have resident software embedded therein associated with the present system. Upon linking the terminal device to the server node, the system transmits a software agent to the terminal device that cooperates with other software modules on the server-side that together form the overall delivery system. The software agent informs the system of the terminal device configuration and processing capacities for decompressing and displaying the data. The software agent also reports certain relevant information to the system of the characteristics of the communication channel between the terminal and the server. Such information includes, without limitation: latency, bandwidth, and signal path integrity. Based upon terminal device configuration and real time updates of channel characteristics and capabilities, the system actively manages transmission of the compressed data stream by varying parameters such as buffer length, transmitted bit rate, and error correction. The system also feeds operating conditions to the compression system to dynamically alter encoding and compression settings to optimize delivery of the data. The delivery software agent resident on the terminal device decompresses the data stream that is composed of segment-by-segment variations in compression/decompression algorithm and settings thereof. Dependent upon the terminal device configuration, and especially for very thin clients, instructions may be refreshed on a segment-by-segment basis for each decompression algorithm and encoding setting combination. Instructions for decompressing may also be kept resident if appropriate to the terminal device.

The software agent described for transmission to and operation by the destination device is therefore also considered a highly beneficial aspect of the compression/delivery systems and methods described. By delivering the software agent to the device from the source, a wide range of existing destination devices may be used for communication according to methods that may include variable uses of one or more algorithms or other operations at the transmission source. In other words, the destination devices may not be required to be "format-specific" players as is required by much of the conventional streaming and static media communication systems. Also, by providing the destination agent with a diagnostic capability, diagnostic information may be gathered at the destination device and transmitted back to the source in a format that is compliant for use by the source in its neural network process for achieving the proper CODEC operation for a given set of circumstances.

The use of a client-side agent to supply quality of service information including client-side device data and communication channel status in real time is therefore also believed to be broadly beneficial beyond the specific applications and combinations of other aspects of the invention also herein provided. In addition, the processing of each unit of compressed, transmission-ready data to accommodate client-side device and real-time communication channel conditions is also broadly contemplated as having broad-reaching benefits. Still further, a system and method is described that provides instructions to a client-side agent to enable decompression of each sequential, uniquely compressed unit of data. Therefore, another broad benefit of the invention provides a destination device (such as from the transmission source as herein described for the particular embodiments) with a CODEC that is adapted to decompress a compressed representation of an original media signal into a decompressed representation based upon variable parameters related to at least one of the following: aspects of the original media signal, transmission channel constraints, and destination device constraints. In another broad aspect, the destination device is adapted to use a CODEC that is chosen from a library of CODECS based upon a parameter related to an aspect of the original media signal.

The systems and methods herein described are also considered applicable to the signal processing of each unique, sequential unit of signal data, e.g., signal clip, video frame, or individual packet as appropriate. In addition, the system and its various sub-systems may also be purely software that must be loaded into each appropriate device, or it may be embedded in a host hardware component or chip, e.g. on the server side, or in certain circumstances, on the client side (e.g. various aspects of the destination agent), or for example may be stored such as in flash memory.

The various aspects of the media compression system and method just described are considered beneficial for use according to a wide range of known and soon anticipated media communication needs, including for example according to the various communications devices, communication/transmission channel formats and standards, and media types and formats elsewhere herein described (e.g. in the "Background" section above).

Figure 6:
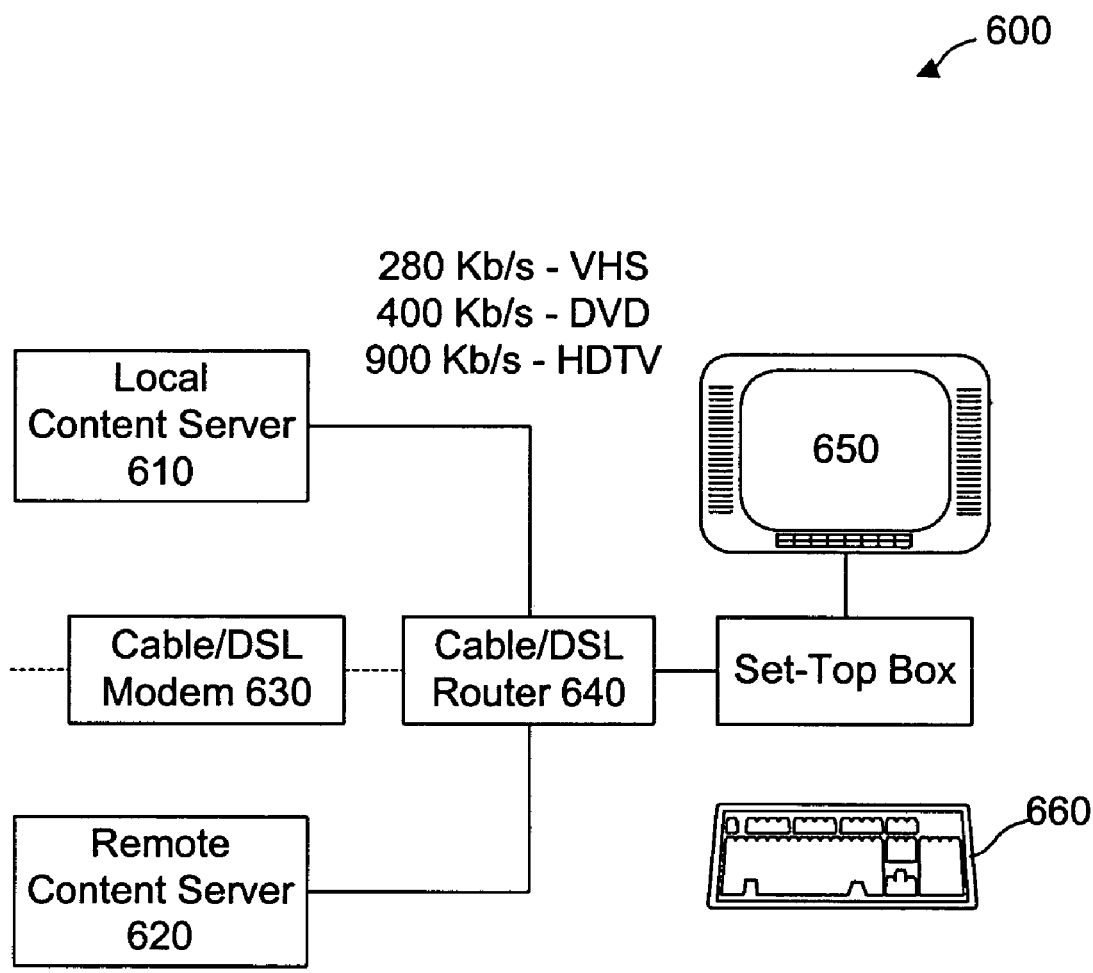
FIG. 6 shows a schematic block flow diagram of various interrelated components of a "video-on-demand" streaming video communications system according one embodiment of the invention.

However, for the purpose of further understanding, FIG. 6 shows a schematic view of the overall streaming media communications system 600 as specifically applied to "video-on-demand" aspects according to one embodiment of the present invention, wherein many different end users 610-620 at many different locations may request and receive, real-time (e.g. without substantial delay), pre-recorded video from a remote source. Further to the information provided in FIG. 6, at least one specific implementation of the media communication system 600 delivers the following types of video at the following bit-rates (denotes compressed representations of original signals that are convertible by a destination device to decompressed representations having no or insubstantial loss as observed by the eye of the typical human observer): VHS-format video as low as about 250 Kbs; DVD-format video at about 400 Kbps; and HDTV-format video at about 900 Kbps. According to these speeds, it is believed that video-on-demand may be provided by telephone carriers over resident transmission line channels, such for example over existing DSL lines 630-640.

However, as available bandwidth and mass communication continue to present issues, it is believed that even greater efficiencies may be achieved resulting in delivery of compressed representations of these types of video signals at even lower bit rates. Again, as elsewhere herein described, the compression efficiencies of the invention are closely related to and improve as a function of the processing power made available to the neural network 440, and the neural network's 440 continued learning and training with respect to varied types of media. These resources may even make more remarkable compression efficiencies achievable without modification to the fundamental features of the present invention.

Therefore, the following are further examples of transmission rates for certain compressed video signals that are believed to be desirable and achievable according to one embodiment of the invention: VHS-format video as low as about 200 Kbps, more preferably as low as about 150 Kbps, and still more preferably as low as about 100 Kbps; DVD-format video as low as about 350 Kbps, more preferably as low as about 300 Kbps, and still more preferably as low as about 250 Kbps; and HDTV-format video as low as about 800 Kbps, and still more preferably as low as about 700 Kbps.

Moreover, at least one implementation of the media communications system 400 of one embodiment of the invention delivers 20-24 frames/sec color video at a transmission rate of 7 Kbps. This is believed to enable substantial advances in communication of streaming media signals via to wireless destination devices via the WAP Gateway, as is further developed elsewhere hereunder.

It is also to be appreciated that, while video communication has been emphasized in this disclosure, other types of streaming or static media are also contemplated. For example, at least one implementation of the compression and delivery embodiments has been observed to provide substantially CD-quality sound (e.g. via compressed representations of original signals that are convertible by a destination device to decompressed representations having no or insubstantial loss as observed by the ear of the typical human observer) at a bit-rate of about 24 Kbps. At these rates, audiophile-quality sound may be delivered for playing over dial-up modems. However, with further regard to available resource commitment and extent of neural network training, it is further contemplated that the invention is adapted to deliver CD-quality sound at speeds as low as about 20 Kbps, and even as low as about 15 Kbps or even 10 Kbps.

Wireless Audio Communications System

Figure 7:
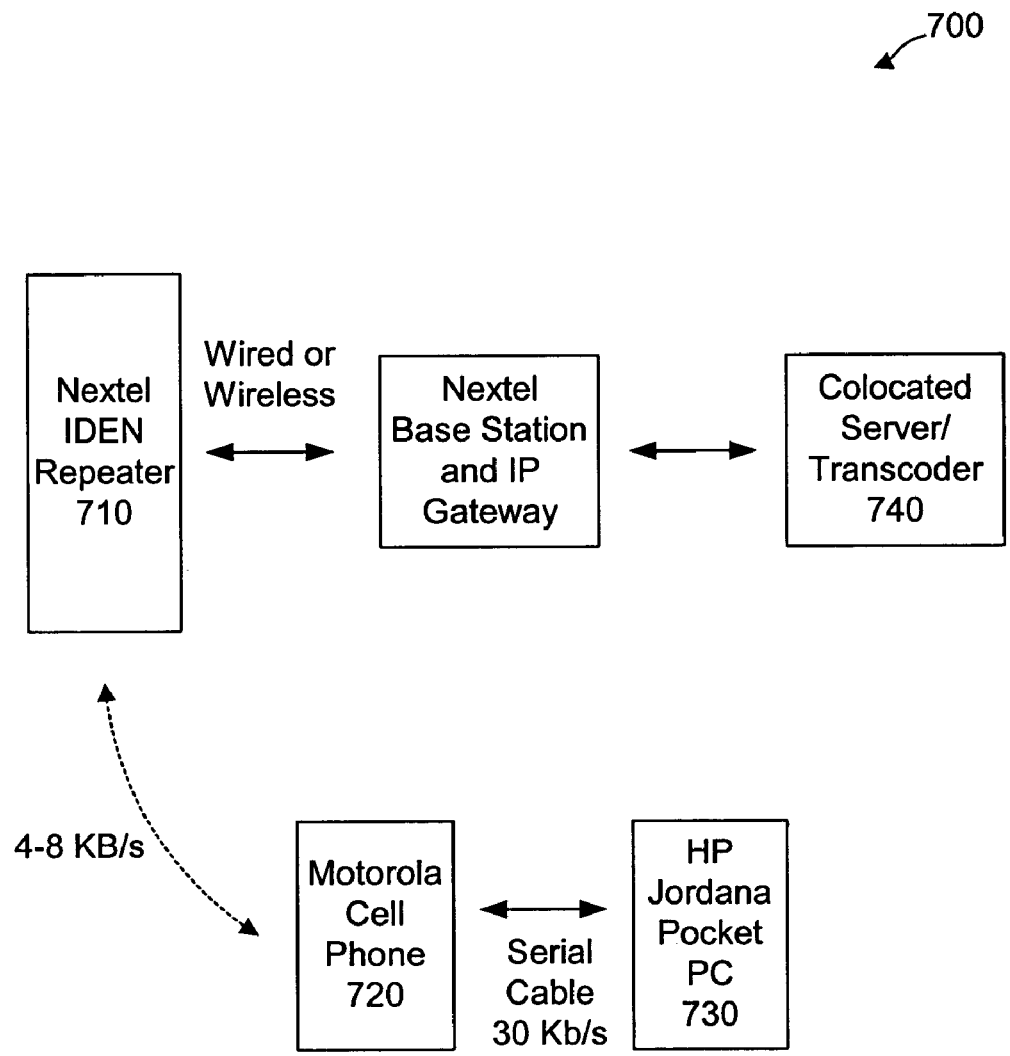
FIG. 7 shows a schematic block flow diagram of various interrelated components of a wireless streaming video communications system according to one embodiment of the present invention.
Figure 8:
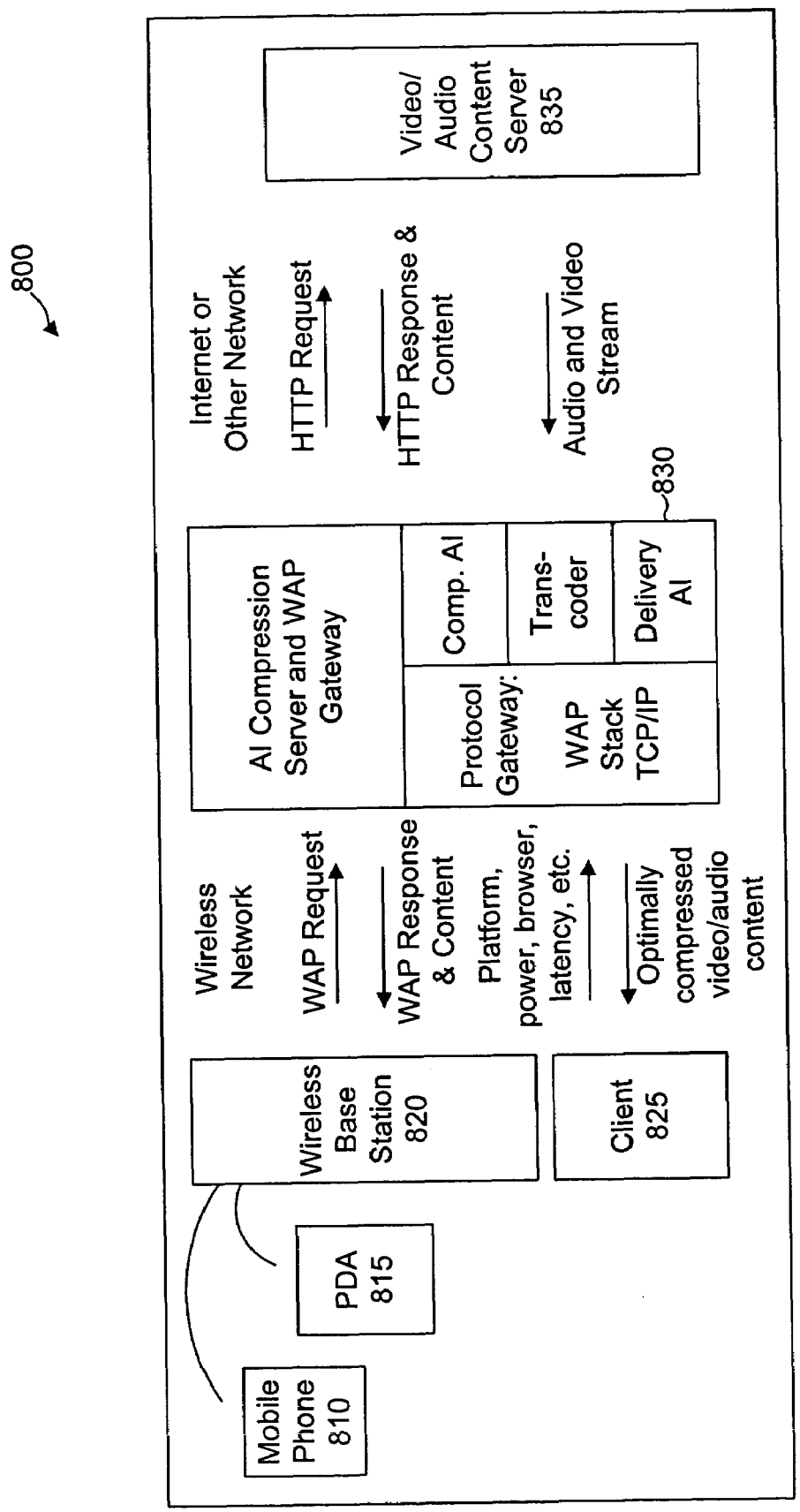
FIG. 8 shows a schematic block flow diagram of various interrelated components of a WAP gateway media communications system according one embodiment of the present invention.

It is further contemplated that the streaming media communication system of the invention has particularly useful applications within wireless audio communications networks, and in particular cellular telephony networks. Therefore, FIGS. 7 and 8 schematically show, with respectively increasing amounts of detail, streaming media communications systems 700 and 800 respectively specifically applied to wireless audio communications systems according to certain specific, respective embodiments of the present invention. While particular devices, system parameters, or arrangements of communicating devices shown are believed to be beneficial in the overall application of the invention, they are not to be considered limiting and may be suitably replaced with other substitutes according to one of ordinary skill based upon this disclosure. The various wireless communications systems 700 and 800, standards, and protocols referenced elsewhere in this disclosure are thus incorporated into this section for the purpose of integration with the various aspects of compression, delivery, decompression, and transcoding according to one embodiment of the invention.

Combination of the communications system 400 of one embodiment of the present invention with the other components of a cellular communications network allows for the enhanced compression, delivery, and decompression according to the invention to manifest in an increased quality of service for wireless audio communications. Improvements in cellular communications according to the invention include, without limitation, the following examples: increasing available bandwidth, extending range of reception, and providing graceful degradation while maintaining connectivity during periods of low signal quality or reception levels.

More specifically, cellular telephony signals are characterized by relatively high degrees of variability, due for example to the roaming positions of clients, and limited cell ranges, atmospheric conditions, and significantly limited and changing available bandwidths over daily use cycles. Therefore, a self-optimizing CODEC management system according to the present invention is particularly well suited to adjust the appropriate communications and compression modalities to the changing environment. At the very least, the increase in compression efficiency and resulting decrease in bandwidth used for given signals is a valuable achievement as wireless channel traffic continues to congest.

Figure 9:
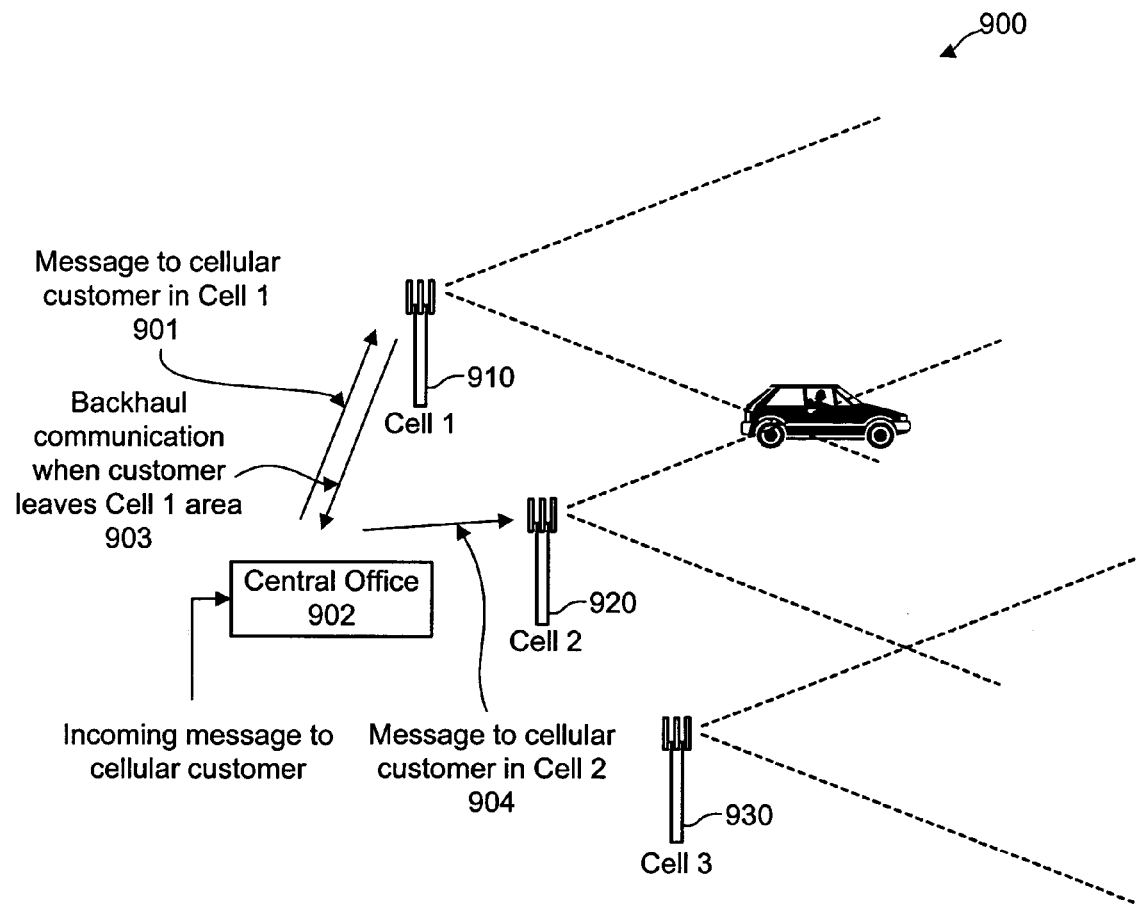
FIG. 9 shows a schematic block flow diagram of various interrelated components of a wireless communications system during backhauling according to one particular mode of use of the media communications system of an embodiment the present invention.

In one particular regard, the increased compression efficiency according to the present invention is well applied to improving bandwidth issues during "soft hand-offs" between cells, as illustrated in FIG. 9. During cellular phone communications, whenever a transmitter or receiver migrates between cell coverage zones, communications bandwidth requirements and resultant costs are increased by systemic requirement to "pass off" active communications between cells. The act of passing off the communication results in a "backhaul" channel from the previously active cellular transmitter to a central office for forwarding to a newly active cellular transmitter. The backhaul channel represents a significant use of bandwidth. Savings will result from increased compression. As Figure shows, such "backhauling" may include a doubling (media sent back from first cell being left and resent to second cell for transmission) or even a quadrupling (overlapping communication from both first and second cells) in the bandwidth used for communicating a particular signal.

The media communications system 400 of the present invention may recognize when backhaul is occurring, such as according to the transmission channel diagnostics provided in the software agent(s), and may respond by adjusting the degree of compression to compensate.

WAP Video Gateway

With a particular view of the rapid growth observed and predicted in the wireless or mobile Internet, embodiments of the present invention contemplate application of the intelligent compression/delivery/decompression embodiments in combination with WAP Gateway functionality.

A system and method is therefore also provided according to the invention for encoding, compressing and transmitting complex digital media (e.g., video pictures) via bandwidth-constrained wireless communications systems utilizing Wireless Applications Protocol (WAP). In one embodiment, data is processed by the system, resident at a server node(s), employing neural networks with artificial intelligence. Sample segments of data are captured from the input stream and processed to comply with requirements unique to the class of clients. As is described in detail above, the system correlates the continuously varying digital data streams' characteristics with libraries of pre-developed experientially learned rules and with externally imposed constraints to optimally choreograph the coherence, continuity and detail of the data as ultimately received, decoded and presented at the client interface.

A gateway provided with the added functionality of the streaming media communications system herein described is shown schematically in FIG. 8. According to the WAP gateway system 830, a client agent is provided that is adapted to run on a variety of platforms, and requires no specialized hardware to decode the video streams. According to use of the streaming media delivery system of the invention elsewhere herein described, the viewer of the WAP device maintains constant communication with the system server upstream, such that the user-side client 825 may provide the encoding platform with relevant information for streaming media communication, including without limitation: available screen size, processing power, client operating system and browser version, connection speed and latency, thereby allowing the streaming media delivery system to tailor the stream to each individual client it "talks" to. Accordingly, an AI driven server 830 incorporating the AI compression as herein described may be combined with a WAP Gateway 830, combining the necessary WAP to TCP/IP protocol (or other protocol, e.g. dual server stack) translation with a Video and Audio Server 835 employing compression, delivery, and decompression systems and methods herein described. The WAP Gateway 830 may further include a video transcoder, such as for example incorporating the transcoder systems and methods herein described. An appropriate host architecture according to this system (not shown) generally includes a rack mount system running Linux OS with a modified WAP Gateway 830 or as a software plug-in to existing servers.

This WAP gateway system 830 may be further provided in a Master/Slave relationship as another beneficial aspect of the overall streaming media delivery architecture (applicable to other delivery systems other than specifically wireless). Various content distribution networks, such as available through Akamai and Inktomi, have capitalized on the concept of improving data delivery over the Internet by using "smart caching" on servers which reside on the borders of the Internet. Such a Master/Slave relationship is maintained by the present system wherein a Master Server resides at the source of the content to be delivered and Slave Servers reside on the borders. These servers communicate "intelligently" to optimize the content delivery over the Internet and reduce latency, bandwidth and storage requirements, improving the overall quality of the video/audio stream to the end-user and decreasing the cost of media delivery to the content provider.

The WAP gateway 830 of the present invention supports continued growth in mobile communications, as large telecommunications operators are transitioning to multi-service broadband networks, and as the number of subscribers to the mobile Internet continues to expand rapidly. In particular, mobile communications is a broad class of systems and protocols, each having its own constraints and needs for interacting devices to communicate streaming media. The Gateway 830 in a particularly beneficial aspect may support a variety of "2G" systems with upgradability for upcoming "2.5G" and "3G" network technologies (numerical progression of systems generally represents progression of Internet-enabled capabilities).

The following Table 3 provides examples of known mobile communication standards, and provides certain related information used by the AI system of the present invention for optimizing communication of streaming media amongst the field of mobile destination devices as media players:

TABLE 3

Existing/Soon Anticipated Mobile Communications Standards

| MODE | BAUD RATE (generally) |
|---|---|
| GSM (2G) | 9.6 Kbps |
| CDMA | 9.6 Kbps |
| TDMA | 14.4 Kbps |
| CDPD | 14.4 Kbps |
| iMODE | 128 Kbps |
| GPRS | 144 Kbps |
| WCDMA or CDMA2000 | 144 Kbps to 2 Mbps |
| GSM (3G) | 2 Mbps |

In addition, the present invention is particularly beneficial in its ability to stream a wide variety of media signals to various different types of wireless communications devices. Examples of wireless communications devices that are appropriate for use with the streaming media communications systems and methods of the invention, and which the systems and methods support interchangeably, are provided in the following Table 4:

TABLE 4

Examples of Internet-enabled PDA's

| DEVICE | MAKE | SPEED | MEMORY | SCREEN DEPTH | SCREEN SIZE | MODEM TYPE | CONNECT SPEED |
|---|---|---|---|---|---|---|---|
| iPAQ | Compaq | 206 MHz | 16-64 Mb | 12 b/pixel color | 320 × 240 | External (e.g. CDPD) | 9600-14.4 Kbps |
| Palm VII | Palm | 33 MHz | 4-16 Mb | 4 b/pixel b/w 8 b/pixel color | | Internal | 14.4 Kbps |
| Handspring | Palm | 33 MHz | 4-16 Mb | 4 b/pixel b/w; 8 b/pixel color | | External | 14.4 Kbps |
| Blackberry | Research-In-Motion | 33 MHz | 4 Mb | 2 b/pixel b/w | | Internal | 9.6-14.4 Kbps |
| Jornada | HP | 133 MHz | 16-32 Mb | 18 b/pixel | 320 × 240 | External | 9.6-14.4 Kbps |
| Casseopeia | Casio | 150 Mhz | 16-31 Mb | 12 b/pixel | 320 × 240 | External | 9.6-14.4 Kbps |

Various specific examples are described later below that provide observations of actual wireless Internet applications of the invention as herein described. Such examples include use of a CODEC library according to varied parameters associated with at least the following (without limitation): destination wireless communication device; transmission channel; communications protocol; and the respective streaming media signals themselves. The various particular features of the systems and methods used according to these examples are contemplated as further defining independently beneficial aspects of the invention.

Shared Interactive Environment

Figure 10:
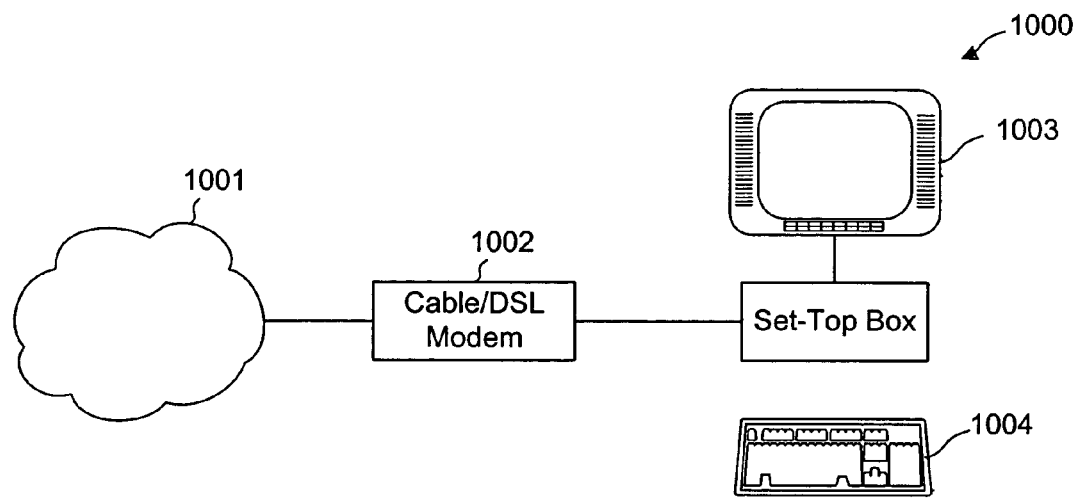
FIG. 10 shows a schematic block flow diagram of various interrelated components of an interactive gaming communications system and set-top TV browsing of one embodiment of the present invention.
Figure 10:
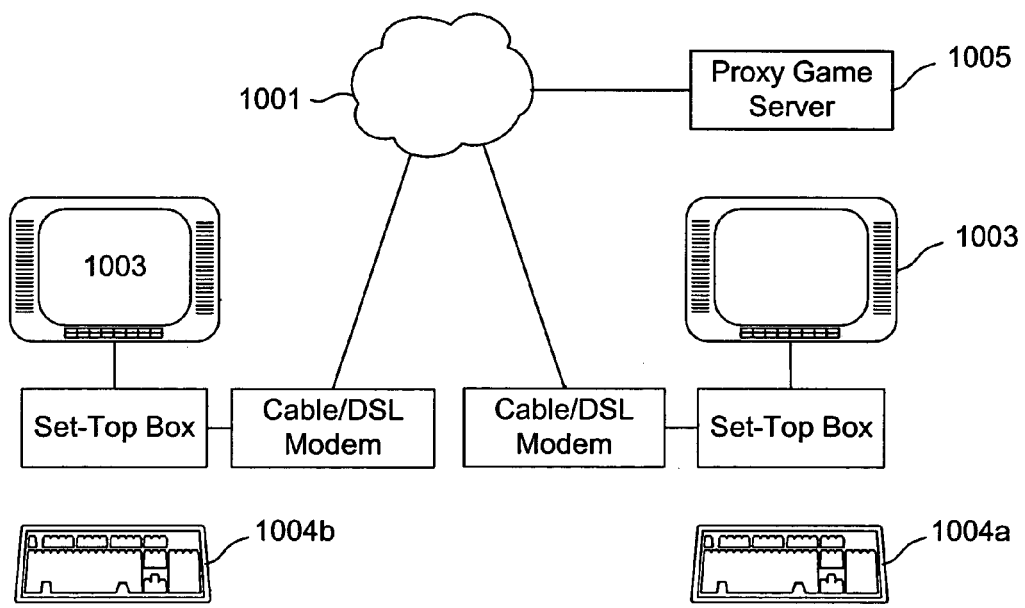

A system and method is also provided according to the invention for enabling real-time remote client interaction with a high-definition, multi-dimensional, multi-participant simulated environment without the need for significant client-side processing capacity. More specifically, FIG. 10 shows an overall streaming media communication system as applied to shared interactive gaming according to the invention.

This system includes: (i) a proxy server; (ii) graphics rendering capabilities; (iii) a client software agent for feedback of client inputs to the game; (iv) a client software agent for supporting the delivery system of the invention; and (v) streaming from the server to the client. It is contemplated that for multiple clients, which typically represent shared interactive gaming by design, multiple components as just described are provided to support each client.

The interactive gaming embodiments contemplate implementation of data compression and delivery embodiments with devices that are also destination devices for compressed signals from other like, remotely located device systems. This arrangement is broadly beneficial, such as for example in further interactive media implementations such as video conferencing and the like. Accordingly, each remote system is both a source and a destination device, and sends and receives agents between it and other remote systems.

Destination Device

Although the communications systems of the present invention enables communication of streaming media signals to a wide variety of destination devices, a further contemplated feature of the invention provides a remote receiver to be housed as a destination device/player by client users. This set-top player may be adapted to serve at least one, though preferably multiple ones, and perhaps all, of the following: Video on Demand (VOD); Music on Demand (MOD); Interactive Gaming on Demand (IGOD); Voice Over Internet Protocol ("VoIP"), any technology providing voice telephony services over IP connections; Television Web Access; Digital Video Recording to record, pause, and playback live television; e-mail; chat; a DVD player; and other applications apparent to one of ordinary skill. All of this may be delivered to existing televisions in the comfort of users' own homes. Moreover, clients utilizing this box, or other systems interfacing with the communications system of the invention, may receive DVD quality video and surround sound over cable and DSL connections.

EXAMPLES

For the purpose of further illustrating the highly beneficial results that may be achieved according to the invention, the following are examples of specific embodiments that have been used for different types of streaming media communication, including observed results with pertinent discussion. These examples illustrate communication the same pre-recorded video over different transmission channels and to different destination devices, wherein the pre-recorded video has the following originating properties: 720 lines of resolution and 32 bits of color information, an originating file size of about 1.4 Gigabytes.

Example 1

An "iPAQ" model 3650 hand-held PDA (commercially available from Compaq, Inc. for approximately $500 at the time of this disclosure) was provided. The PDA was interfaced with a 14.4 Kbps (max) wireless CDPD modem ("AirCard 300" wireless external modem, commercially available from Sierra Wireless for approximately $200 at the time of this disclosure) using an extension assembly (iPAQ™ PCMCIA expansion sleeve from Compaq, Inc.) with a PCMCIA card slot that couples to the wireless modem. The iPAQ™ used is generally characterized as having the following processing parameters: 206 MHz processor; 32 Mb memory; 12 b/pixel color; 240×320 screen dimensions; PocketPC™ operating system version 3.0 from Microsoft Corp. and stereo sound. The iPAQ™ was connected to the Internet in San Francisco, Calif. via the interfaced CDPD modem over the AT&T cellular wireless carrier system at a connection bandwidth of about 13.3 Kbit/sec. A server located in San Jose, Calif. (approximately 50 mi away) was contacted by the PDA employing the http and rtsp protocols, and the PDA was used to initiate a request for a pre-recorded video having the following originating properties: 720 lines of resolution and 32 bits of color information, the originating file size was 1.4 Gigabytes. Within about seven seconds, a compressed approximation of the pre-recorded video was received, decompressed, and displayed by the PDA on the PDA's screen. The entire video was seen at 240×320×12 bpp resolution in full motion without observable delays or defects.

Example 2

A "Jornada™" model 548 hand-held PDA (commercially available from HP, Inc. for approximately $300 at the time of this disclosure) was provided. The PDA was interfaced with a 9.6 Kbps (max) wireless CDMA phone ("Motorola i85s" wireless external digital cellular phone, commercially available from Motorola authorized vendors for approximately $200 at the time of this writing) using adaptor cables (Motorola and HP RS-232 standard interface cables from Motorola and HP.) that couple the phone and PDA together to form a wireless modem. The Jornada model PDA device used is generally characterized as having the following processing parameters: 133 MHz processor; 32 Mb memory; 12 b/pixel color; 240×320 screen dimensions; PocketPC™ operating system version 3.0 from Microsoft Corp. and stereo sound. The Jornada™ was connected to the Internet in Newark, N.J. via the interfaced CDMA phone/modem over the Nextel digital cellular wireless carrier system at a connection bandwidth of 8 Kbit/sec. A server located in San Jose, Calif. (approximately 2900 mi away) was contacted by the PDA employing the http and WDP protocols, and the PDA was used to initiate a request for a pre-recorded video having the following originating properties: 720 lines of resolution and 32 bits of color information, the originating file size was 1.4 Gigabytes. Within about seven seconds, a compressed approximation of the pre-recorded video was received, decompressed, and displayed by the PDA on the PDA's screen. The entire video was seen at 176×120×8 bpp in full motion without observable delays or defects.

Example 3

A "Set-top Box" model st850 book PC (commercially available from MSI, Inc. for approximately $300 at the time of this writing) was provided. The Set-top Box was interfaced with a 10 Mbps (max) ethernet/802.11 connection using CAT5 ethernet cables (Generic) that couple the Set-top Box to a broadband connection (DS3). The Set-top Box used is generally characterized as having the following processing parameters: 400 MHz processor; 64 Mb memory; 32 b/pixel color; 720 lines of screen resolution; Windows CE operating system version 2.11 from Microsoft Corp. and AC3 digital 6 channel surround-sound. The Set-top Box was connected to the Internet in Newark, N.J. via the interfaced shared DS3 connection over the Alter.Net Internet Backbone at a connection bandwidth of 376 Kbit/sec. A server located in San Jose, Calif. (approximately 2900 mi away) was contacted by the Set-top Box employing the http and rtsp protocols, and the Set-top Box was used to initiate a request for a pre-recorded video having the following originating properties: 720 lines of resolution and 32 bits of color information, the originating file size was 1.4 Gigabytes. Within About nine seconds, a compressed approximation of the pre-recorded video was received, decompressed, and displayed by the Set-top Box on a commercially available reference monitor's (Sony) screen. The entire video was seen at 720 lines×32 bpp in full motion without observable delays or defects.

While various particular embodiments have been herein shown and described in great detail for the purpose of describing the invention, it is to be appreciated that further modifications and improvements may be made by one of ordinary skill based upon this disclosure without departing from the intended scope of the invention. For example, various possible combinations of the various embodiments that have not been specifically described may be made and still fall within the intended scope of the invention. According to another example, obvious improvements or modifications may also be made to the various embodiments and still fall within the intended scope of this invention.

What is claimed is:

1. A method comprising:
   obtaining a media signal to be communicated to a destination agent, the media signal being separated into a plurality of segments each comprising a number of temporally adjacent frames; and
   repeating for each of the plurality of segments:
      testing a plurality of different CODECs on the segment to determine how each CODEC encodes the segment in terms of quality and compression level;
      automatically selecting the CODEC that produces the highest quality encoded output for the segment according to a set of criteria without exceeding a bandwidth constraint;
      delivering the segment encoded using the selected CODEC to the destination agent; and
      reporting to the destination agent which CODEC was used to encode the segment;
   wherein at least two segments are encoded using different CODECs.

2. The method of claim 1, further comprising storing an association between one or more identified characteristics of a segment and the selected CODEC.

3. The method of claim 2, further comprising:
   in response to a subsequent segment of the media signal being found to have the same one or more identified characteristics, automatically selecting the CODEC from the stored association to encode the subsequent segment.

4. The method of claim 3, wherein the CODEC is automatically selected from the stored association by an artificial intelligence (AI) system.

5. The method of claim 4, wherein the AI system comprises a neural network.

6. The method of claim 2, wherein the characteristics of the segment are selected from the group consisting of temporal characteristics, spatial characteristics, and logical characteristics.

7. The method of claim 1, wherein testing further comprises:
   storing a baseline snapshot of the segment; and
   for each CODEC to be tested:
      encoding the segment at or below the bandwidth constraint using one of the CODECs;
      decoding the segment using the same CODEC; and
      comparing the quality of the decoded segment with the baseline snapshot according to the set of criteria.

8. The method of claim 7, wherein comparing further comprises comparing the quality according to a Peak Signal-to-Noise Ratio (PSNR).

9. The method of claim 1, further comprising adjusting the bandwidth constraint based on constraints of at least one of the destination agent and a transmission channel to the destination agent.

10. The method of claim 1, wherein the CODECs are selected from the group consisting of block CODECs, fractal CODECs, and wavelet CODECs.

11. The method of claim 1, wherein delivering further comprises transmitting the encoded segment to the destination agent through a network; and wherein reporting comprises sending an indication of which CODEC was used to encode the segment through the network to the destination agent.

12. The method of claim 1, wherein delivering further comprises storing the encoded scene on a storage medium; and wherein reporting comprises storing an indication of which CODEC was used to encode the scene on the storage medium.

13. A system comprising:
   an input module to obtain a media signal to be communicated to a destination agent, the media signal being separated into a plurality of segments each comprising a number of temporally adjacent frames;
   a selection module to test a plurality of different CODECs on each of the plurality of segments to determine how each CODEC encodes each segment in terms of quality and compression level, wherein the selection module is further to select the CODEC that produces the highest quality encoded output for each segment according to a set of criteria without exceeding a bandwidth constraint;
   an output module to deliver each segment encoded using a respective selected CODEC to the destination agent and report to the destination agent which CODEC was used to encode each segment.

14. The system of claim 13, wherein the selection module tests the plurality of CODECs on a segment by storing a baseline snapshot of the segment and, for each CODEC to be tested, encoding the segment at or below the bandwidth constraint using one of the CODECs, decoding the segment using the same CODEC, and comparing the quality of the decoded segment with the baseline snapshot according to the set of criteria.

15. The system of claim 14, wherein the quality is compared according to a Peak Signal-to-Noise Ratio (PSNR).

16. The system of claim 13, wherein the selection module is to store an association between one or more identified characteristics of a segment and the selected CODEC.

17. The system of claim 16, wherein the selection module, in response to a subsequent segment of the media signal being found to have the same one or more identified characteristics, is to automatically select the CODEC from the stored association to encode the subsequent segment.

18. The system of claim 17, wherein the CODEC is automatically selected from the stored association by an artificial intelligence (AI) system.

19. The system of claim 18, wherein the AI system comprises a neural network.

20. The system of claim 16, wherein the characteristics of the scene are selected from the group consisting of temporal characteristics, spatial characteristics, and logical characteristics.

21. The system of claim 13, wherein the selection module is to adjust the bandwidth constraint in response to constraints of at least one of the destination agent and a transmission channel to the destination agent.

22. The system of claim 13, wherein the CODECs are selected from the group consisting of block CODECs, fractal CODECs, and wavelet CODECs.

23. A system comprising:
means for obtaining a media signal to be communicated to a destination agent, the media signal being separated into a plurality of segments each comprising a number of temporally adjacent frames;
means for testing a plurality of different CODECs on each of the plurality of segments to determine how each CODEC encodes the segment in terms of quality and compression level;
means for selecting the CODEC that produces the highest quality encoded output for each segment according to a set of criteria without exceeding a bandwidth constraint;
means for delivering each segment encoded using a respective selected CODEC to the destination agent and report to the destination agent which CODEC was used to encode each segment.

24. The system of claim 23, wherein the testing means tests the plurality of CODECs on a segment by storing a baseline snapshot of the segment and, for each CODEC to be tested, encoding the segment at or below the bandwidth constraint using one of the CODECs, decoding the segment using the same CODEC, and comparing the quality of the decoded segment with the baseline snapshot according to the set of criteria.

25. The system of claim 24, wherein the quality is compared according to a Peak Signal-to-Noise Ratio (PSNR).

26. The system of claim 23, wherein the selection means stores an association between one or more identified characteristics of the segment on which the CODECs were tested and the selected CODEC.

27. The system claim 26, wherein the selection means, in response to a subsequent segment of the media signal being found to have the same one or more identified characteristics, automatically selects the CODEC from the stored association to encode the subsequent segment.

28. The system of claim 27, wherein the selection means comprises an artificial intelligence (AI) system.

29. The system of claim 28, wherein the AI system comprises a neural network.

30. The system of claim 26, wherein the characteristics of the scene are selected from the group consisting of temporal characteristics, spatial characteristics, and logical characteristics.

31. The system of claim 23, wherein the selection means is to adjust the bandwidth constraint in response to constraints of at least one of the destination agent and a transmission channel to the destination agent.

32. The system of claim 23, wherein the CODECs are selected from the group consisting of block CODECs, fractal CODECs, and wavelet CODECs.

33. A method comprising:
obtaining a media signal to be communicated to a destination agent, the media signal being separated into a plurality of segments each comprising a number of temporally adjacent frames; and
repeating for each of the plurality of segments:
simultaneously testing a plurality of different CODECs on the segment to determine how each CODEC encodes the segment in terms of quality and compression level;
automatically selecting the CODEC that produces the highest quality encoded output for the segment according to a set of criteria without exceeding a bandwidth constraint;
delivering the segment encoded using the selected CODEC to the destination agent; and
reporting to the destination agent which CODEC was used to encode the segment.

34. The method of claim 33, wherein the CODECs are simultaneously tested on the segment using a plurality of processors operating in parallel.

35. The method of claim 33, wherein testing further comprises:
storing a baseline snapshot of the segment; and
for each CODEC to be tested:
encoding the segment at or below the bandwidth constraint using one of the CODECs;
decoding the segment using the same CODEC; and
comparing the quality of the decoded segment with the baseline snapshot according to the set of criteria.

* * * * *